United States Patent
Fukatani et al.

(10) Patent No.: US 11,203,182 B2
(45) Date of Patent: Dec. 21, 2021

(54) FILLING-BONDING MATERIAL, PROTECTIVE SHEET-EQUIPPED FILLING-BONDING MATERIAL, LAMINATED BODY, OPTICAL DEVICE, AND PROTECTIVE PANEL FOR OPTICAL DEVICE

(71) Applicant: SEKISUI CHEMICAL CO., LTD., Osaka (JP)

(72) Inventors: Juichi Fukatani, Osaka (JP); Takazumi Okabayashi, Osaka (JP); Kozo Nakamura, Osaka (JP); Atsushi Wada, Osaka (JP); Hiroyuki Nakatani, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/330,180

(22) PCT Filed: Jan. 16, 2018

(86) PCT No.: PCT/JP2018/001045
§ 371 (c)(1),
(2) Date: Mar. 4, 2019

(87) PCT Pub. No.: WO2018/135495
PCT Pub. Date: Jul. 26, 2018

(65) Prior Publication Data
US 2019/0202173 A1    Jul. 4, 2019

(30) Foreign Application Priority Data

Jan. 17, 2017  (JP) .............................. JP2017-006216
May 17, 2017  (JP) .............................. JP2017-098472

(Continued)

(51) Int. Cl.
*B32B 1/00*   (2006.01)
*B32B 3/26*   (2006.01)
(Continued)

(52) U.S. Cl.
CPC .................. *B32B 7/12* (2013.01); *B32B 1/00* (2013.01); *B32B 3/263* (2013.01); *B32B 5/142* (2013.01);
(Continued)

(58) Field of Classification Search
None
See application file for complete search history.

(56) References Cited

U.S. PATENT DOCUMENTS 4,679,918 A * 7/1987 Ace .......................... G02C 7/02
                                                  351/159.62
4,985,099 A * 1/1991 Mertens ............ B32B 17/10137
                                                  156/94

(Continued)

FOREIGN PATENT DOCUMENTS

CN    102445774 A  *  5/2012
CN    102541340 A  *  7/2012

(Continued)

OTHER PUBLICATIONS

Machine Translation of JP-2008001535-A, Jan. 2008 (Year: 2008).*
(Continued)

*Primary Examiner* — Jeffrey A Vonch
(74) *Attorney, Agent, or Firm* — Wenderoth, Lind & Ponack, L.L.P.

(57) ABSTRACT

The present invention aims to provide a filling-bonding material that is suitably used to fill a space between parts, while bonding the parts, in optical devices in various shapes not limited to flat shapes. The present invention also aims to provide a protective sheet-equipped filling-bonding mate-
(Continued)

rial, a laminate, an optical device, and a protective panel for an optical device each including the filling-bonding material. Provided is a filling-bonding material having a shape with an uneven thickness.

22 Claims, 8 Drawing Sheets

(30) Foreign Application Priority Data

May 17, 2017 (JP) .............................. JP2017-098473
May 18, 2017 (JP) .............................. JP2017-099221

(51) Int. Cl.

| B32B 7/12 | (2006.01) |
|---|---|
| B32B 17/10 | (2006.01) |
| B32B 27/30 | (2006.01) |
| C09J 7/10 | (2018.01) |
| C09J 129/14 | (2006.01) |
| B32B 7/023 | (2019.01) |
| B32B 5/14 | (2006.01) |
| G02F 1/1333 | (2006.01) |
| G06F 3/041 | (2006.01) |
| B32B 17/04 | (2006.01) |
| C09J 11/00 | (2006.01) |
| B32B 27/06 | (2006.01) |
| B32B 27/04 | (2006.01) |

(52) U.S. Cl.
CPC .............. *B32B 7/023* (2019.01); *B32B 17/10* (2013.01); *B32B 17/10018* (2013.01); *B32B 17/1066* (2013.01); *B32B 17/10568* (2013.01); *B32B 17/10761* (2013.01); *B32B 17/10935* (2013.01); *B32B 27/306* (2013.01); *C09J 7/10* (2018.01); *C09J 129/14* (2013.01); *B32B 17/04* (2013.01); *B32B 17/10036* (2013.01); *B32B 17/10697* (2013.01); *B32B 17/10706* (2013.01); *B32B 17/10743* (2013.01); *B32B 17/10788* (2013.01); *B32B 27/04* (2013.01); *B32B 27/06* (2013.01); *B32B 2250/02* (2013.01); *B32B 2250/03* (2013.01); *B32B 2250/40* (2013.01); *B32B 2307/40* (2013.01); *B32B 2307/4026* (2013.01); *B32B 2307/412* (2013.01); *B32B 2307/418* (2013.01); *B32B 2307/51* (2013.01); *B32B 2307/56* (2013.01); *B32B 2329/00* (2013.01); *B32B 2329/06* (2013.01); *B32B 2457/20* (2013.01); *B32B 2457/208* (2013.01); *B32B 2551/00* (2013.01); *C09J 11/00* (2013.01); *G02F 1/133331* (2021.01); *G06F 2200/1634* (2013.01); *Y10T 428/24479* (2015.01); *Y10T 428/24521* (2015.01); *Y10T 428/24612* (2015.01); *Y10T 428/24777* (2015.01)

(56) References Cited

U.S. PATENT DOCUMENTS

| 5,118,371 | A | * | 6/1992 | Hori | B32B 17/1055 156/102 |
|---|---|---|---|---|---|
| 5,482,767 | A | * | 1/1996 | Karagiannis | B32B 17/10036 428/327 |
| 5,639,538 | A | * | 6/1997 | Wong | B32B 17/10568 428/156 |
| 5,980,666 | A | * | 11/1999 | Roth | B32B 17/10036 156/107 |
| 6,044,662 | A | * | 4/2000 | Morin | C03B 23/0357 65/107 |
| 6,086,983 | A | * | 7/2000 | Yoshizawa | B32B 17/10036 428/215 |
| 6,368,537 | B1 | * | 4/2002 | Sato | B29C 43/183 156/102 |
| 8,576,370 | B1 | * | 11/2013 | Sampica | G02F 1/1335 349/155 |
| 8,619,363 | B1 | * | 12/2013 | Coleman | G02B 19/0014 359/576 |
| 9,063,699 | B1 | * | 6/2015 | Huang | G06F 1/1643 |
| 2002/0027636 | A1 | * | 3/2002 | Yamada | G02F 1/133305 349/155 |
| 2002/0172804 | A1 | * | 11/2002 | Sauer | B32B 17/10036 428/172 |
| 2003/0161044 | A1 | * | 8/2003 | Tokoyoda | G02B 5/1866 359/569 |
| 2003/0162312 | A1 | * | 8/2003 | Takayama | H01L 21/6835 438/22 |
| 2003/0214715 | A1 | * | 11/2003 | Bermel | B32B 17/10761 359/485.01 |
| 2004/0053006 | A1 | * | 3/2004 | Omizu | B65H 18/28 428/156 |
| 2004/0166288 | A1 | * | 8/2004 | Travis | G02B 27/01 428/156 |
| 2005/0083465 | A1 | * | 4/2005 | Niiyama | G02F 1/133308 349/122 |
| 2005/0266247 | A1 | * | 12/2005 | Yoshizawa | C03B 23/0258 428/410 |
| 2006/0209419 | A1 | * | 9/2006 | Dobschal | G02B 27/0101 359/630 |
| 2006/0216909 | A1 | * | 9/2006 | Yamazaki | G02F 1/1368 438/457 |
| 2007/0009714 | A1 | * | 1/2007 | Lee | B32B 17/10568 428/172 |
| 2007/0172642 | A1 | * | 7/2007 | Fukatani | C08L 29/14 428/323 |
| 2008/0047655 | A1 | * | 2/2008 | Karagiannis | B32B 17/10788 156/109 |
| 2008/0083974 | A1 | * | 4/2008 | Chin | H01L 33/58 257/680 |
| 2009/0186552 | A1 | * | 7/2009 | Shinya | G02F 1/133308 445/58 |
| 2009/0284904 | A1 | * | 11/2009 | Wu | G02F 1/133305 361/679.01 |
| 2009/0324881 | A1 | * | 12/2009 | Takeuchi | G02B 7/00 428/131 |
| 2010/0085692 | A1 | * | 4/2010 | Kim | G06F 1/1656 361/679.01 |
| 2010/0086744 | A1 | * | 4/2010 | Stenzel | B32B 17/10568 428/174 |
| 2010/0090981 | A1 | * | 4/2010 | Park | G06F 3/041 345/174 |
| 2010/0118245 | A1 | * | 5/2010 | Toyoda | G02F 1/133308 349/122 |
| 2010/0287990 | A1 | * | 11/2010 | Hsu | C03B 23/0252 65/107 |
| 2010/0314900 | A1 | * | 12/2010 | Labrot | B32B 17/10036 296/90 |
| 2010/0321801 | A1 | * | 12/2010 | Tokunaga | G02B 3/00 359/796 |
| 2011/0085352 | A1 | * | 4/2011 | Ito | H01L 33/54 362/617 |
| 2011/0205472 | A1 | * | 8/2011 | Kobayashi | B32B 17/06 349/104 |
| 2011/0281072 | A1 | * | 11/2011 | Sabia | C03B 23/0357 428/156 |
| 2011/0310488 | A1 | * | 12/2011 | Tomotoshi | H04N 9/12 359/601 |
| 2012/0025559 | A1 | * | 2/2012 | Offermann | B32B 17/10761 296/84.1 |
| 2012/0069273 | A1 | * | 3/2012 | Watanabe | G02B 27/30 349/64 |
| 2012/0070624 | A1 | * | 3/2012 | Payen | C03B 23/023 428/172 |

(56) References Cited

U.S. PATENT DOCUMENTS

| | | | |
|---|---|---|---|
| 2012/0081874 A1* | 4/2012 | Wu | G02F 1/1333 361/807 |
| 2012/0111479 A1* | 5/2012 | Sung | B32B 17/10146 156/102 |
| 2012/0111491 A1* | 5/2012 | Huang | H05K 3/0014 156/247 |
| 2012/0151760 A1* | 6/2012 | Steijner | B24B 7/24 29/831 |
| 2012/0325402 A1* | 12/2012 | Suwa | C09J 5/06 156/275.5 |
| 2013/0004719 A1* | 1/2013 | Thellier | B32B 17/10568 428/157 |
| 2013/0027384 A1* | 1/2013 | Ferris | G02B 27/026 345/418 |
| 2013/0215362 A1* | 8/2013 | Koike | G02B 5/3025 349/62 |
| 2013/0224440 A1* | 8/2013 | Trajkovska | G02B 5/1814 428/161 |
| 2013/0265667 A1* | 10/2013 | Liu | B32B 17/10706 359/867 |
| 2013/0295357 A1* | 11/2013 | Cleary | B32B 17/10119 428/215 |
| 2013/0321740 A1* | 12/2013 | An | H05K 5/02 349/58 |
| 2014/0011000 A1* | 1/2014 | Dunkmann | B60J 1/008 428/174 |
| 2014/0049699 A1* | 2/2014 | Huang | G02B 5/3025 349/12 |
| 2014/0063719 A1* | 3/2014 | Yamazaki | G06F 1/1637 361/679.21 |
| 2014/0092346 A1* | 4/2014 | Yang | H01L 51/5237 349/84 |
| 2014/0093702 A1* | 4/2014 | Kitajima | C03B 23/0252 428/174 |
| 2014/0111910 A1* | 4/2014 | Lin | H04M 1/0268 361/679.01 |
| 2014/0126131 A1* | 5/2014 | Lee | G06F 1/1601 361/679.3 |
| 2014/0132132 A1* | 5/2014 | Chowdhury | B32B 17/1055 312/223.1 |
| 2014/0141206 A1* | 5/2014 | Gillard | B32B 17/10036 428/174 |
| 2014/0198436 A1* | 7/2014 | Lim | G06F 1/1601 361/679.01 |
| 2014/0220286 A1* | 8/2014 | Honeycutt | B32B 38/06 428/41.8 |
| 2014/0226111 A1* | 8/2014 | Kim | G02F 1/1333 349/96 |
| 2014/0226112 A1* | 8/2014 | Kim | G02F 1/133305 349/96 |
| 2014/0287203 A1* | 9/2014 | Hsu | B32B 17/10 428/201 |
| 2014/0340609 A1* | 11/2014 | Taylor | H01L 27/3251 349/58 |
| 2014/0364549 A1* | 12/2014 | Lu | C08L 29/14 524/291 |
| 2015/0010742 A1* | 1/2015 | Han | B32B 27/36 428/215 |
| 2015/0036077 A1* | 2/2015 | Lee | G02B 6/0081 349/65 |
| 2015/0077873 A1* | 3/2015 | Johnson | B32B 37/18 359/871 |
| 2015/0103474 A1* | 4/2015 | Cho | B32B 27/308 361/679.01 |
| 2015/0138484 A1* | 5/2015 | Watanabe | G02F 1/133526 349/58 |
| 2015/0145755 A1* | 5/2015 | Yamazaki | G09G 3/03 345/76 |
| 2015/0185889 A1* | 7/2015 | Nakamura | G06F 3/041 345/173 |
| 2015/0208537 A1* | 7/2015 | Cho | H01L 27/3225 216/24 |
| 2015/0210144 A1* | 7/2015 | Ishioka | C03C 17/3405 296/84.1 |
| 2015/0239211 A1* | 8/2015 | Yoon | B32B 38/145 428/41.8 |
| 2015/0251377 A1* | 9/2015 | Cleary | B32B 17/10 428/172 |
| 2015/0253914 A1* | 9/2015 | Hamada | B32B 17/10 345/173 |
| 2015/0291852 A1* | 10/2015 | Yamamoto | B32B 7/12 428/41.8 |
| 2015/0323961 A1* | 11/2015 | Leonhard | H04B 1/3888 428/38 |
| 2015/0324045 A1* | 11/2015 | Chi | B32B 37/02 345/173 |
| 2015/0351272 A1* | 12/2015 | Wildner | G02F 1/133308 361/679.21 |
| 2016/0066412 A1* | 3/2016 | Choi | G06F 1/1637 361/704 |
| 2016/0066440 A1* | 3/2016 | Choi | G06F 1/1656 361/679.3 |
| 2016/0083282 A1* | 3/2016 | Jouanno | B32B 17/10 156/102 |
| 2016/0085131 A1* | 3/2016 | Lam | G02F 1/157 359/244 |
| 2016/0107421 A1* | 4/2016 | Chung | B32B 17/10 428/41.8 |
| 2016/0113135 A1* | 4/2016 | Kim | B32B 17/10889 361/679.01 |
| 2016/0120043 A1* | 4/2016 | Kim | B32B 15/046 362/97.1 |
| 2016/0135314 A1* | 5/2016 | Ma | H04B 1/3888 428/177 |
| 2016/0168353 A1* | 6/2016 | Spangler | C08K 5/103 428/172 |
| 2016/0291324 A1* | 10/2016 | Arndt | B32B 17/10761 |
| 2016/0295715 A1* | 10/2016 | Cho | B32B 7/12 |
| 2016/0306451 A1* | 10/2016 | Isoda | B32B 27/325 |
| 2016/0364076 A1* | 12/2016 | Shimoda | G06F 3/0445 |
| 2017/0008377 A1* | 1/2017 | Fisher | B32B 17/1088 |
| 2017/0013731 A1* | 1/2017 | Lee | H05K 5/0017 |
| 2017/0015082 A1* | 1/2017 | Creytens | B32B 27/18 |
| 2017/0033311 A1* | 2/2017 | Baek | H01L 51/5237 |
| 2017/0036414 A1* | 2/2017 | Notsu | B32B 17/10908 |
| 2017/0041990 A1* | 2/2017 | Taylor | H01L 27/3251 |
| 2017/0052562 A1* | 2/2017 | Yamawaki | B60K 37/00 |
| 2017/0059917 A1* | 3/2017 | Kao | G02F 1/133308 |
| 2017/0082784 A1* | 3/2017 | Niu | H04M 1/0266 |
| 2017/0088749 A1* | 3/2017 | Tsuchida | B32B 38/18 |
| 2017/0094039 A1* | 3/2017 | Lu | B32B 27/08 |
| 2017/0108959 A1* | 4/2017 | McMillan | G06F 3/041 |
| 2017/0108960 A1* | 4/2017 | Lee | B32B 27/06 |
| 2017/0117247 A1* | 4/2017 | Burggraf | H01L 24/27 |
| 2017/0147098 A1* | 5/2017 | Fukatani | C08K 5/103 |
| 2017/0150628 A1* | 5/2017 | Amin | C03C 21/005 |
| 2017/0178589 A1* | 6/2017 | Finkenbiner-Pepper | G02B 7/025 |
| 2017/0180711 A1* | 6/2017 | Wingrove | G02B 3/0075 |
| 2017/0183438 A1* | 6/2017 | Nishimura | C08G 75/045 |
| 2017/0184775 A1* | 6/2017 | Kang | G02B 6/0045 |
| 2017/0242247 A1* | 8/2017 | Tso | G02B 5/00 |
| 2017/0274623 A1* | 9/2017 | Sherman | B32B 27/08 |
| 2017/0305240 A1* | 10/2017 | Aoki | B32B 3/263 |
| 2017/0313036 A1* | 11/2017 | Lin | B32B 27/32 |
| 2017/0324060 A1* | 11/2017 | Kim | B32B 17/06 |
| 2017/0327402 A1* | 11/2017 | Fujii | C03B 23/023 |
| 2017/0374752 A1* | 12/2017 | Kim | H05K 5/0017 |
| 2018/0002573 A1 | 1/2018 | Kawakita et al. | |
| 2018/0024594 A1* | 1/2018 | Park | C09J 7/22 156/60 |
| 2018/0039127 A1* | 2/2018 | Eom | G06F 3/0443 |
| 2018/0111569 A1* | 4/2018 | Faik | B60R 13/02 |
| 2018/0149867 A1* | 5/2018 | Kremers | B32B 17/10568 |
| 2018/0188870 A1* | 7/2018 | Boggs | B32B 17/10853 |
| 2018/0208131 A1* | 7/2018 | Mattelet | C03C 3/087 |
| 2018/0235091 A1* | 8/2018 | Kim | G06F 3/0412 |
| 2018/0257978 A1* | 9/2018 | Minamidate | C03C 15/00 |
| 2018/0264794 A1* | 9/2018 | Martin | B32B 37/12 |

(56) References Cited

U.S. PATENT DOCUMENTS

| | | | |
|---|---|---|---|
| 2018/0270975 A1* | 9/2018 | Ishikawa | H01L 51/5275 |
| 2018/0272657 A1* | 9/2018 | Ryu | B32B 37/18 |
| 2018/0326706 A1* | 11/2018 | Oota | B32B 27/306 |
| 2018/0348516 A1* | 12/2018 | Sadakane | B32B 17/10568 |
| 2018/0356570 A1* | 12/2018 | Wu | B32B 17/10 |
| 2018/0364760 A1* | 12/2018 | Ahn | G06F 1/1652 |
| 2019/0023947 A1* | 1/2019 | Sitter | C09J 133/08 |
| 2019/0047261 A1* | 2/2019 | Keller | B32B 17/10577 |
| 2019/0050025 A1* | 2/2019 | Wilson | B32B 7/12 |
| 2019/0073001 A1* | 3/2019 | Kim | G02F 1/133308 |
| 2019/0217579 A1* | 7/2019 | Byrne | B32B 17/10036 |
| 2019/0239372 A1* | 8/2019 | Park | C09J 7/22 |
| 2019/0243137 A1* | 8/2019 | Sadakane | B32B 3/263 |
| 2019/0329480 A1* | 10/2019 | Guo | C08J 5/18 |
| 2019/0329531 A1* | 10/2019 | Brennan | B29C 45/1418 |
| 2019/0332217 A1* | 10/2019 | Boggs | B60K 35/00 |
| 2020/0002586 A1* | 1/2020 | Liu | B32B 23/20 |
| 2020/0017720 A1* | 1/2020 | Liu | C09J 4/06 |

FOREIGN PATENT DOCUMENTS

| | | | | |
|---|---|---|---|---|
| CN | 202976041 U | * | 6/2013 | |
| CN | 103631437 A | * | 3/2014 | |
| CN | 103780718 A | * | 5/2014 | |
| CN | 103881621 | | 6/2014 | |
| CN | 103996695 A | * | 8/2014 | |
| CN | 104461129 A | * | 3/2015 | |
| CN | 104558997 | | 4/2015 | |
| CN | 104884258 | | 9/2015 | |
| CN | 104914604 A | * | 9/2015 | |
| CN | 104951130 A | * | 9/2015 | B32B 27/22 |
| CN | 105094399 A | * | 11/2015 | G02F 1/13 |
| CN | 204981641 | | 1/2016 | |
| CN | 205880840 U | * | 1/2017 | |
| DE | 19535053 A1 | * | 4/1996 | B32B 17/10036 |
| EP | 1 880 243 | | 1/2008 | |
| EP | 3 284 731 | | 2/2018 | |
| JP | 60-021834 | | 2/1985 | |
| JP | 08-081242 | | 3/1996 | |
| JP | 2000259084 A | | 9/2000 | |
| JP | 2004018326 A | * | 1/2004 | C03B 27/0445 |
| JP | 2004-075501 | | 3/2004 | |
| JP | 2008001535 A | * | 1/2008 | B32B 17/10559 |
| JP | 2009035444 A | * | 2/2009 | B32B 17/10348 |
| JP | 2009-227826 | | 10/2009 | |
| JP | 2011-074308 | | 10/2009 | |
| JP | 2010197929 A | * | 9/2010 | |
| JP | 2011-028239 | | 2/2011 | |
| JP | 2011074308 A | * | 4/2011 | |
| JP | 2011088801 A | * | 5/2011 | B60J 1/008 |
| JP | 2011207645 A | * | 10/2011 | B32B 17/10568 |
| JP | 2013246741 A | * | 12/2013 | |
| JP | 2014026384 A | * | 2/2014 | |
| JP | 2014-508959 | | 4/2014 | |
| JP | 2014096061 A | * | 5/2014 | |
| JP | 2014115705 A | * | 6/2014 | |
| JP | 2014219508 A | * | 11/2014 | |
| JP | 2015092422 A | * | 5/2015 | |
| JP | 2016-513029 | | 5/2016 | |
| KR | 20140013155 A | * | 2/2014 | |
| KR | 20140070046 A | * | 6/2014 | |
| KR | 101657136 B1 | * | 9/2016 | |
| TW | 201631100 | | 9/2016 | |
| TW | 201636204 | | 10/2016 | |
| TW | 1561896 B | * | 12/2016 | |
| WO | 2006/122305 | | 11/2006 | |
| WO | 2014/123681 | | 8/2014 | |
| WO | WO-2015133285 A1 | * | 9/2015 | G02B 7/025 |
| WO | WO-2015152334 A1 | * | 10/2015 | B32B 27/22 |
| WO | WO-2016074917 A1 | * | 5/2016 | B32B 7/12 |
| WO | 2016/167287 | | 10/2016 | |
| WO | 2016/196531 | | 12/2016 | |
| WO | WO-2016208452 A1 | * | 12/2016 | G02F 1/13 |

OTHER PUBLICATIONS

Machine Translation of JP-2011088801-A, May 2011 (Year: 2011).*
Machine Translation of CN-202976041-U, Jun. 2013 (Year: 2013).*
Machine Translation of CN-205880840-U, Jan. 2017 (Year: 2017).*
Dhaliwal et al., The characterization of polyvinyl butyral by thermal analysis, Aug. 2002, Thermochimica Acta, vol. 391, Issues 1-2, pp. 245-255 (Year: 2002).*
International Search Report dated Apr. 10, 2018 in International (PCT) Application No. PCT/JP2018/001045.
Extended European Search Report dated Sep. 3, 2020 in corresponding European Patent Application No. 18741145.9.

* cited by examiner

FIG. 1(a)
FIG. 1(b)
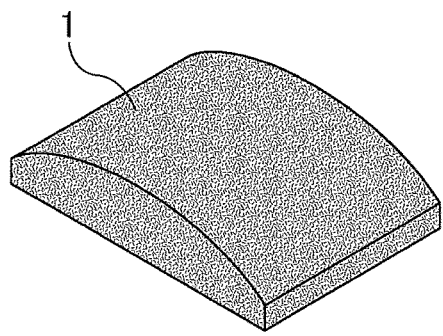
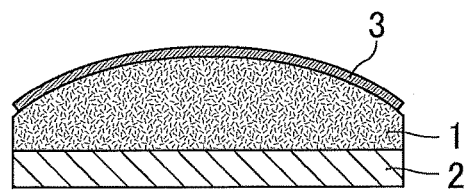
FIG. 2(a)
FIG. 2(b)
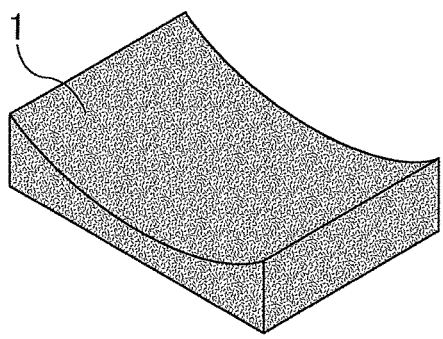
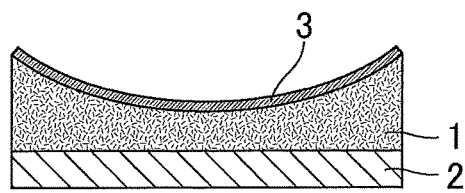
FIG. 3(a)
FIG. 3(b)
FIG. 3(c)
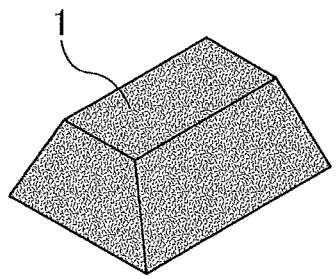
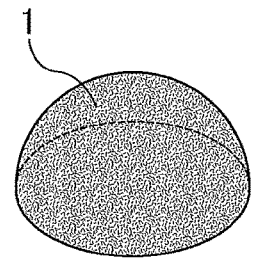
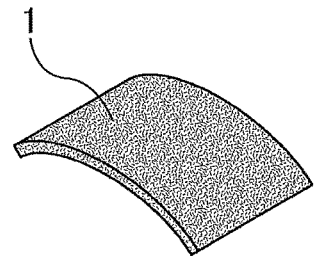

FIG.8
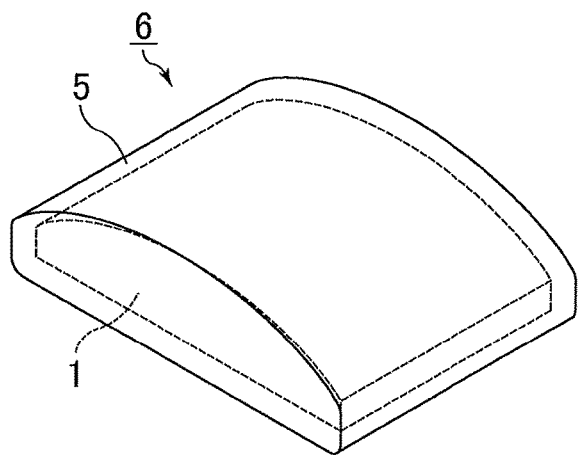
FIG. 9(a)    FIG. 9(b)
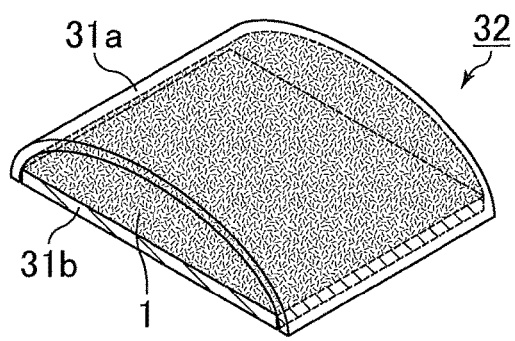 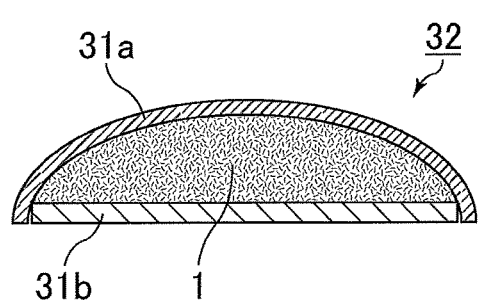
FIG. 10(a)   FIG. 10(b)
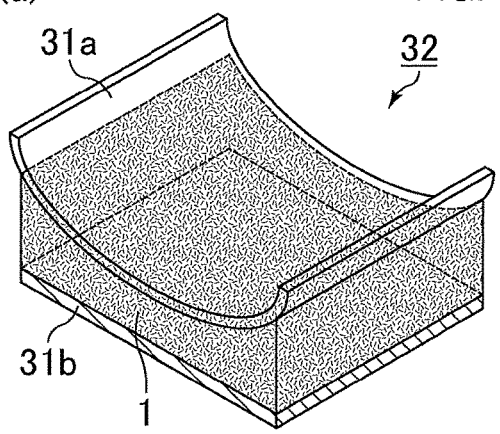 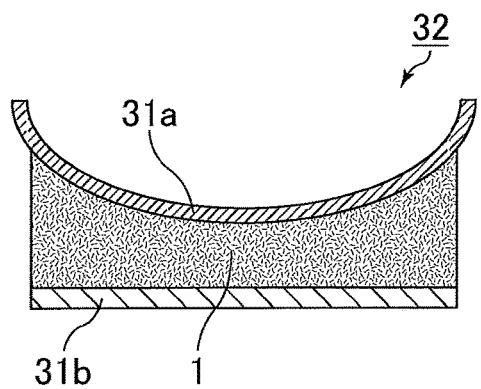

Normal plane 1　Normal plane 2

Normal plane 1

Normal plane 2

«FILLING-BONDING MATERIAL, PROTECTIVE SHEET-EQUIPPED FILLING-BONDING MATERIAL, LAMINATED BODY, OPTICAL DEVICE, AND PROTECTIVE PANEL FOR OPTICAL DEVICE»

TECHNICAL FIELD

The present invention relates to a filling-bonding material that is suitably used to fill a space between parts, while bonding the parts, in optical devices in various shapes not limited to flat shapes. The present invention also relates to a protective sheet-equipped filling-bonding material, a laminate, an optical device, and a protective panel for an optical device each including the filling-bonding material.

BACKGROUND ART

Transparent adhesive sheets and the like are known to fill a space between parts, while bonding the parts, in optical devices. For example, acrylic adhesives are widely used to fill a space between a display module or a touch panel module and a surface protection panel made of glass or the like (see Patent Literature 1, for example). In such devices, a space between parts is filled with a transparent adhesive sheet having a small difference in refractive index with the parts to improve the optical quality (e.g., transparency, luminance, and contrast), thereby improving the visibility.

CITATION LIST

Patent Literature

Patent Literature 1: JP 2011-74308 A

SUMMARY OF INVENTION

Technical Problem

Conventional thin sheet-shaped acrylic adhesives may cause entrapment of bubbles upon lamination and the bubbles may remain between the surface protection panels and the acrylic adhesives, possibly lowering the visibility or durability. Some surface protection panels have printing portions formed at the peripheries on the rear side for the purpose of masking or the like. Bubbles may remain at boundary portions of unevenness formed by such printing portions or unevenness formed by electrical wiring, possibly lowering the visibility or durability.

Along with the recent diversification of optical devices, optical devices having various shapes, not limited to flat shapes, have been developed for achieving better design. Optical devices or display devices with curved surfaces are now proposed. Such devices are presumably configured by bonding a display module or a touch panel module and a curved surface protection panel to each other. However, these parts cannot be directly bonded to each other because conventional thin sheet-shaped acrylic adhesives cannot fill the gap therebetween. The gap is supposed to be a 1-mm to several-centimeter size in accordance with the design of the product. Such a thick acrylic adhesive is difficult to produce.

In touch panels, in particular, misalignment between the touched portion and the corresponding display content may cause troubles in operation or performance of the device. In devices with a curved interface having a difference in refractive index, conventional thin sheet-shaped acrylic adhesives hardly provide the display performance equivalent to that of devices with a flat interface.

The present invention aims to provide a filling-bonding material that is suitably used to fill a space between parts, while bonding the parts, in optical devices in various shapes not limited to flat shapes. The present invention also aims to provide a protective sheet-equipped filling-bonding material, a laminate, an optical device, and a protective panel for an optical device each including the filling-bonding material.

Solution to Problem

The present invention relates to a filling-bonding material having a shape with an uneven thickness. The present invention is specifically described in the following.

The present inventors found out that a filling-bonding material having a shape with an uneven thickness, i.e., having a shape corresponding to the shape of a space between parts to be bonded, can be suitably used to fill a space between parts, while bonding the parts, in optical devices in various shapes not limited to flat shapes. The use of such a filling-bonding material can provide, even to optical devices in various shapes not limited flat shapes, the display performance and mechanical strength equivalent to those of flat optical devices.

The filling-bonding material as used herein refers to a material capable of bonding adherends by itself without any bond or adhesive at the interface with the adherends and capable of filling a space (gap) between the adherends.

The filling-bonding material of the present invention has a shape with an uneven thickness.

With such a shape, the filling-bonding material of the present invention can be suitably used to fill a space between parts, while bonding the parts, in optical devices in various shapes not limited to flat shapes. The use of the filling-bonding material of the present invention can provide, even to optical devices in various shapes not limited to flat shapes, the display performance and mechanical strength equivalent to those of flat optical devices.

The shape with an uneven thickness as used herein refers to a shape other than rectangles (cuboid), and examples thereof include a shape with a thickness that is not even and has a deviation. However, the material is not regarded to have a shape with an uneven thickness in the case where it is deformed to have a shape with an uneven thickness by application of a pressure but is uniform in thickness and flat when it is left to stand still at room temperature, such as common thin films or adhesive sheets.

The filling-bonding material of the present invention preferably has a curved surface.

Specific examples of the curved surface include a convex surface and concave surface. The curved surface may constitute a part of the surface of the filling-bonding material or the entire surface of the filling-bonding material. The filling-bonding material of the present invention may have a minute structure on the surface. The shape with an uneven thickness herein does not include the minute structure itself on the surface. Specifically, even in the case where the filling-bonding material macroscopically having a smooth flat surface has a microscopic structure (e.g., surface roughness of several nanometers to several tens of micrometers), such a shape is not included in the shape with an uneven thickness.

The filling-bonding material of the present invention more preferably has a curved surface with a principal curvature of $1/5{,}000$ mm$^{-1}$ or higher. The principal curvature herein refers to the maximum value of the normal curvature. The curvature of a curved surface can be expressed as 1/R wherein R represents a curvature radius. The lower limit of the principal curvature is more preferably $1/2{,}000$ mm$^{-1}$, still more preferably $1/1{,}000$ mm$^{-1}$.

The curved surface preferably has an arc length of 50 mm or longer. The arc length of the curved surface refers to the length of a curve formed by intersection between the subject curved surface and a normal plane that gives its principal curvature (maximum value of the normal curvature) (also referred to as normal section).

The curved surface preferably has a chord length of 50 mm or longer. The chord length of the curved surface herein refers to the distance between the end points of the normal section.

FIG. 17 shows views schematically explaining the arc length and chord length of a curved surface.

The curved surface preferably has a positive or negative Gaussian curvature. In other words, the Gaussian curvature is preferably not 0 (zero). The Gaussian curvature is the product of the maximum value and the minimum value of the normal curvature. Such a curved surface has no direction in which the curvature is 0 (zero). The filling-bonding material having such a curved surface can constitute a more complicated curved surface, and therefore is applicable to optical devices in various shapes not limited to flat shapes. It can provide optical devices with excellent designs while achieving the display performance and mechanical strength similar to those of flat optical devices.

Specific examples of the shape of the filling-bonding material of the present invention include: column shapes such as polygonal column, circular column, and semicircular column shapes; cone shapes such as pyramid and circular cone shapes; truncated cone shapes such as prismoid and circular truncated cone shapes; spherical, semispherical, or ellipsoidal shapes; and shapes combining any of these. These shapes may partly have openings or through holes. Examples of the shape having a through hole include hollow cylindrical shapes.

The shape of the filling-bonding material of the present invention can be appropriately designed and processed according to the shape of parts to be bonded (adherends). Moreover, the shape of the filling-bonding material of the present invention can be appropriately designed and processed to follow the decorative printing portion unevenness (unevenness formed by printing portions on the rear side of the surface protection panel), wiring unevenness (unevenness formed by the wiring formed in the touch panel), unevenness formed between a chassis provided at the periphery of a touch panel module or a display module and a touch panel screen or a display screen, or the like.

The filling-bonding material of the present invention having a shape with an uneven thickness may be formed by preparing the material in several parts (blocks) and finally bonding the blocks together into the shape with an uneven thickness. The blocks may be bonded together into the shape with an uneven thickness by any method. Preferably, a liquid bonding aid is applied to or impregnated into each block and the resulting blocks are held for a certain period of time under heat and pressure. Such a method can reduce bubbles remaining between blocks and allows easy formation of a seamless filling-bonding material even in a large or complicated shape with an uneven thickness. Adjustment of the application method of the liquid bonding aid or heat and pressure conditions allows temporary adhesion of blocks.

The liquid bonding aid preferably contains a liquid plasticizer. The liquid bonding aid is not particularly limited, and examples thereof include plasticizers which are used together with a polyvinyl acetal described later, alcohols (e.g., ethanol), reactive diluents, and water. Two or more of these liquid bonding aids may be used in admixture. The liquid bonding aid may contain a polyvinyl acetal resin, a photopolymerization initiator, and an adhesion aid (e.g., silane coupling agent).

The lower limit of the maximum value (t1) of the thickness of the filling-bonding material of the present invention is preferably 300 μm. With the maximum value (t1) of the thickness of 300 μm or more, the filling-bonding material of the present invention can fill the gap and bond the adherends, even when the adherends are difficult to have the gap therebetween filled and bonded with a conventional thin sheet-shaped adhesive. The lower limit of the maximum value (t1) of the thickness is more preferably 500 μm, still more preferably 1,000 μm.

The thickness of the filling-bonding material refers to the length of the filling-bonding material in the direction perpendicular to the bonding plane of a pair of parts (adherends) to be bonded with the filling-bonding material. In the case of a complicated surface shape, the maximum value (t1) of the thickness may be determined with the length in the optical axis direction (main direction in which emitting or receiving light travels) of the optical device taken as the thickness.

The lower limit of the difference between the maximum value (t1) and the minimum value (t2) of the thickness of the filling-bonding material of the present invention is preferably 100 μm. With the difference of 100 μm or more, the filling-bonding material of the present invention can fill a space formed by a comparatively large curved surface. The lower limit of the difference is more preferably 300 μm.

The lower limit of the maximum value of the width of the filling-bonding material of the present invention is preferably 50 mm, more preferably 100 mm.

The width of the filling-bonding material refers to the length of the filling-bonding material in a direction perpendicular to the thickness of the filling-bonding material.

The filling-bonding material of the present invention preferably has at least one flat surface. With such a structure, the adherend may be a conventional display module or touch panel module commonly having a flat shape. In particular, the filling-bonding material of the present invention preferably has a shape including a flat surface and a curved surface (convex or concave surface) facing the flat surface. Such a shape may be referred to as a convex or concave lens shape. The filling-bonding material having such a shape can be suitably used to fill a space between a commonly flat display module or touch panel module and a curved surface protection panel, while bonding them, in an optical device having a curved shape to provide a panel with excellent design having excellent handleability during the production.

The filling-bonding material of the present invention preferably has a light-transmitting portion. The light-transmitting portion can guide the light entering the bonded parts (adherend) to the outside of the filling-bonding material or introduce the incident light from the outside. The bonded parts (adherends) and the filling-bonding material are preferably bonded at the light-transmitting portion, and may also be bonded in a region other than the light-transmitting portion. In other words, the filling-bonding material of the present invention may have a main bonding plane and a sub-bonding plane. The filling-bonding material having such a structure and the parts to be bonded (adherends) can be bonded to each other at a portion other than the light-transmitting portion, and therefore, the filling-bonding material can fill a space between the parts and bond them without lowering the optical quality even if the parts to be bonded (adherends) are in a complicated shape. The main bonding plane and the sub-bonding plane may or may not be continuous to each other. The main bonding plane and the sub-bonding plane may be on the same flat surface or on the same curved surface. The filling-bonding material of the present invention may have a plurality of main bonding planes and a plurality of sub-bonding planes.

FIG. 1 shows views schematically explaining an exemplary filling-bonding material of the present invention and an exemplary embodiment thereof.

A filling-bonding material 1 of the present invention illustrated in FIG. 1(a) has a shape including a flat surface and a convex surface facing the flat surface (convex lens shape). As illustrated in FIG. 1(b), the filling-bonding material 1 of the present invention can fill a space between a flat touch panel module 2 and a curved surface protection panel 3, while bonding them. The touch panel module 2 and the surface protection panel 3 are a pair of parts to be bonded (adherends). The space between the parts to be bonded is filled with the filling-bonding material 1. Thus, a laminate is provided.

FIG. 2 shows views schematically illustrating an exemplary filling-bonding material of the present invention and an exemplary embodiment thereof.

The filling-bonding material 1 of the present invention illustrated in FIG. 2(a) has a shape including a flat surface and a convex surface facing the flat surface (concave lens shape). As illustrated in FIG. 2(b), the filling-bonding material 1 of the present invention can fill a space between the flat touch panel module 2 and the curved surface protection panel 3, while bonding them. The touch panel module 2 and the surface protection panel 3 are a pair of parts to be bonded (adherends). The space between the parts to be bonded is filled with the filling-bonding material 1. Thus, a laminate is provided.

FIG. 3 shows perspective views each schematically illustrating an exemplary filling-bonding material of the present invention.

The filling-bonding material 1 of the present invention illustrated in FIG. 3(a) has a prismoid (truncated pyramid) shape. The filling-bonding material 1 of the present invention illustrated in FIG. 3(b) has a semi-spherical (ellipsoid) shape. The filling-bonding material 1 of the present invention illustrated in FIG. 3(c) has a shape in which curved surfaces face each other. In FIG. 3(c), the curvatures of the facing curved surfaces may be the same as or different from each other.

FIG. 4 shows a perspective view and a cross-sectional view each schematically illustrating an exemplary filling-bonding material of the present invention.

The filling-bonding material 1 of the present invention illustrated in FIG. 4(a) (perspective view) and FIG. 4(b) (cross-sectional view) has a hollow cylindrical shape including a hollow 4. To the hollow 4 can be inserted a part constituting the optical device according to the product design, covering the part or the like with the filling-bonding material of the present invention.

FIG. 5 shows a cross-sectional view schematically illustrating an exemplary filling-bonding material of the present invention and an exemplary embodiment thereof.

As illustrated in FIG. 5, the filling-bonding material 1 of the present invention can fill a space between the flat touch panel module 2 and the curved surface protection panel 3, while bonding them. Moreover, the filling-bonding material 1 of the present invention follows unevenness formed by a chassis 21 that is provided at the periphery of the touch panel module 2 and fills a space inside.

The filling-bonding material of the present invention may be made of any material, and is only required to maintain a shape with uneven thickness at normal temperature by being solid or gel, for example, at normal temperature. Examples of the material of the filling-bonding material of the present invention include cured products of thermoplastic resins or thermosetting resins, cured products of photocurable resins, and mixtures of these. Particularly preferred is the use of a thermoplastic resin.

Examples of the thermoplastic resin include polyvinyl acetals, ethylene-vinyl acetate copolymers, acid-modified olefins, and (meth)acrylic copolymers. Examples of the thermosetting resin include silicone resins and urethane resins. In particular, the filling-bonding material of the present invention preferably contains a polyvinyl acetal at least in the surface.

In the case where a conventional thin sheet-shaped acrylic adhesive is used, molding or processing of a thick acrylic adhesive into a shape with an uneven thickness is difficult. In the case where a polyvinyl acetal is used, however, molding or processing into a shape with an uneven thickness is facilitated, enabling bonding to an adherend. In the case where a polyvinyl acetal is used, the filling-bonding material is also excellent in unevenness followability (foaming prevention) and scattering prevention (performance of preventing scattering of fragments upon breakage of the optical device or the like). Different from the case where a so-called adhesive, such as a conventional thin sheet-shaped acrylic adhesive, is used, the adherend is less likely to be contaminated and the filling-bonding material is reworkable. Accordingly, the filling-bonding material of the present invention is advantageous in terms of cost particularly in the case where the adherend is expensive (e.g., case where the adherend is a surface protection panel made of a large curved glass, case where the touch panel module or display module is expensive). The filling-bonding material of the present invention containing a polyvinyl acetal at least in the surface can strongly bond the adherends by being held for a certain period of time between the adherends under heat and pressure.

The polyvinyl acetal may be a plasticized polyvinyl acetal or a polyvinyl acetal not containing a plasticizer. In particular, preferred is a plasticized polyvinyl acetal. The plasticized polyvinyl acetal herein refers to a resin containing a polyvinyl acetal and a plasticizer.

The polyvinyl acetal can be prepared by acetalizing polyvinyl alcohol that is obtained by saponifying polyvinyl acetate, with an aldehyde in the presence of a catalyst. The degree of saponification of the polyvinyl alcohol is not particularly limited, and is commonly within a range of 70 to 99.9 mol %, preferably within a range of 70 to 99.8 mol %, more preferably 80 to 99.8 mol %.

The polyvinyl alcohol may have any average degree of polymerization. Since a polyvinyl acetal having a larger molecular weight is suitable for achieving better scattering prevention and reworkability, polyvinyl alcohol having a higher average degree of polymerization is preferably used. The lower limit of the average degree of polymerization of the polyvinyl alcohol is preferably 100 and the upper limit thereof is preferably 4,000. When the average degree of polymerization is 100 or higher, the filling-bonding material can have better reworkability. In terms of the mechanical strength, the average degree of polymerization is preferably 200 or higher. When the average degree of polymerization is 200 or higher, reduction in the mechanical strength and the scattering prevention provided by the polyvinyl acetal can be prevented. When the average degree of polymerization is 4,000 or lower, an excessive increase of the solution viscosity upon acetalization of the polyvinyl alcohol can be prevented, leading to appropriate acetalization or molding of the filling-bonding material. The lower limit of the average degree of polymerization is more preferably 600 and the upper limit thereof is more preferably 3,800. The lower limit is still more preferably 800 and the upper limit is still more preferably 3,600.

When the average degree of polymerization is 2,000 or lower, the residual stress can be reduced by adjusting the amount of the plasticizer or the like. The upper limit of the average degree of polymerization is more preferably 1,800, still more preferably 1,500, particularly preferably 900.

Upon acetalization of the polyvinyl alcohol with an aldehyde in the presence of a catalyst, a solution containing the polyvinyl alcohol may be used. Examples of the solvent used for the solution containing the polyvinyl alcohol include water.

Any aldehyde may be used. Commonly, a C1-10 aldehyde is suitably used.

The C1-C10 aldehyde is not particularly limited, and may be a linear aldehyde or a branched aldehyde. Examples of the C1-C10 aldehyde include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. In particular, preferred are n-butyraldehyde, n-hexylaldehyde, and n-valeraldehyde, and more preferred is n-butyraldehyde. These aldehydes may be used alone or in combination of two or more thereof.

Specifically, the polyvinyl acetal preferably contains polyvinyl butyral (in the case where the aldehyde is n-butyraldehyde, the polyvinyl acetal refers to polyvinyl butyral). The use of the polyvinyl butyral allows the filling-bonding material to exhibit an appropriate adhesion force to glass, improving the light resistance and weather resistance. If needed, two or more types of polyvinyl acetals may be used together.

For achieving excellent unevenness followability and foaming prevention, the polyvinyl acetal preferably has a lower degree of intermolecular crosslinking. With a lower degree of intermolecular crosslinking, the polyvinyl acetal can provide a filling-bonding material having better unevenness followability and foaming prevention even if the molecular weight, acetyl group content, and degree of acetalization of the polyvinyl acetal are not changed. Moreover, with a larger molecular weight, the polyvinyl acetal can provide better scattering prevention and reworkability.

Such a polyvinyl acetal having a lower degree of intermolecular crosslinking can be obtained preferably by not excessively adding the aldehyde before or during the acetalization reaction with the aldehyde so as to prevent crosslinking between adjacent polyvinyl alcohol main chains, for example. Addition of the aldehyde in an amount larger than the amount required for the acetalization increases the degree of crosslinking.

The lower limit of the amount of hydroxy groups (hydroxy group content) of the polyvinyl acetal is preferably 16 mol % and the upper limit thereof is preferably 45 mol %. When the hydroxy group content is 16 mol % or higher, the filling-bonding material has a higher adhesion force to glass. When the hydroxy group content is 45 mol % or lower, the polyvinyl acetal is more flexible to have better handleability. In addition, the compatibility between the polyvinyl acetal and the plasticizer is improved, enhancing the unevenness followability of the filling-bonding material. The lower limit of the hydroxy group content is more preferably 18 mol %, still more preferably 20 mol %, particularly preferably 22 mol % and the upper limit thereof is more preferably 40 mol %, still more preferably 38 mol %, furthermore preferably 36 mol %, particularly preferably 35 mol %.

The hydroxy group content of the polyvinyl acetal is a value in percentage of the mole fraction (mol %) obtained by dividing the amount of ethylene groups to which hydroxy groups are bonded by the amount of all the ethylene groups in the main chain. The amount of ethylene groups to which hydroxy groups are bonded can be determined by a method in conformity with "Testing methods for polyvinyl butyral", JIS K6728.

The lower limit of the degree of acetylation (acetyl group content) of the polyvinyl acetal is preferably 0.1 mol % and the upper limit thereof is preferably 30 mol %. When the acetyl group content is 0.1 mol % or higher, the compatibility between the polyvinyl acetal and the plasticizer is enhanced, improving the unevenness followability of the filling-bonding material. When the acetyl group content is 30 mol % or lower, the moisture resistance of the polyvinyl acetal is improved. Also, when the acetyl group content is 30 mol % or lower, reduction in the reaction efficiency during the production of the polyvinyl acetal can be suppressed. The lower limit of the acetyl group content is more preferably 0.2 mol %, still more preferably 0.3 mol % and the upper limit thereof is more preferably 24 mol %, still more preferably 20 mol %, furthermore preferably 19.5 mol %, particularly preferably 15 mol %.

The acetyl group content of the polyvinyl acetal is a value in percentage of the mole fraction (mol %) obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain. The amount of ethylene groups to which acetal groups are bonded can be measured in conformity with "Testing methods for polyvinyl butyral", JIS K6728.

The acetyl group content of the polyvinyl acetal can be adjusted to fall within the above range, for example, by adjusting the degree of saponification of the polyvinyl alcohol. In other words, the acetyl group content of the polyvinyl acetal depends on the degree of saponification of the polyvinyl alcohol. When the polyvinyl alcohol used has a lower degree of saponification, the polyvinyl acetal has a larger acetyl group content. When the polyvinyl alcohol used has a higher degree of saponification, the polyvinyl acetal has a smaller acetyl group content.

The lower limit of the degree of acetalization of the polyvinyl acetal is preferably 50 mol % and the upper limit thereof is preferably 85 mol %. When the degree of acetalization is 50 mol % or higher, the compatibility between the polyvinyl acetal and the plasticizer is enhanced. When the degree of acetalization is 85 mol % or lower, the reaction time needed for the production of the polyvinyl acetal can be shortened. The lower limit of the degree of acetalization is more preferably 54 mol %, still more preferably 58 mol %, particularly preferably 60 mol %. The upper limit of the degree of acetalization is more preferably 82 mol %, still more preferably 79 mol %, particularly preferably 77 mol %.

The degree of acetalization of the polyvinyl acetal is a value in percentage of the mole fraction (mol %) obtained by dividing the amount of ethylene groups to which acetal groups are bonded by the amount of all the ethylene groups in the main chain. The degree of acetalization can be calculated by measuring the acetyl group content and the vinyl alcohol content (content ratio of hydroxy groups) by a method in conformity with "Testing methods for polyvinyl butyral", JIS K6728, calculating the mole fractions based on the measurement results, and subtracting the acetyl group content and the vinyl alcohol content from 100 mol %.

The degree of acetalization of the polyvinyl acetal can be adjusted, for example, by adjusting the amount of the aldehyde. With a smaller amount of the aldehyde, the polyvinyl acetal has a lower degree of acetalization. With a larger amount of the aldehyde, the polyvinyl acetal has a higher degree of acetalization.

The polyvinyl acetal may have any glass transition temperature (Tg). For achieving better scattering prevention and reworkability, the Tg is preferably 10° C. or higher.

Any conventionally known plasticizer may be used without limitation. A plasticizer may be used alone or two or more plasticizers may be used in combination. Examples of the plasticizer include organic acid ester plasticizers such as monobasic organic acid esters and polybasic organic acid esters, and phosphoric acid plasticizers such as organophosphate plasticizers and organophosphite plasticizers. Preferred among these are organic acid ester plasticizers. The plasticizer is preferably a liquid plasticizer.

The monobasic organic acid ester is not particularly limited, and examples thereof include a glycol ester obtained by reaction between a monobasic organic acid and a glycol. Examples of the monobasic organic acid include butyric acid, isobutyric acid, caproic acid, 2-ethylbutyric acid, heptylic acid, n-octylic acid, 2-ethylhexylic acid, pelargonic acid (n-nonylic acid), and decylic acid. Examples of the glycol include triethylene glycol, tetraethylene glycol, and tripropylene glycol. The polybasic organic acid ester is not particularly limited, and examples thereof include ester compounds obtained by reaction between a polybasic organic acid (e.g., adipic acid, sebacic acid, azelaic acid) and a C4-C8 linear or branched alcohol.

The organic acid ester plasticizer is preferably a diester plasticizer represented by the following formula (1). The use of the diester plasticizer improves the moldability of the filling-bonding material.

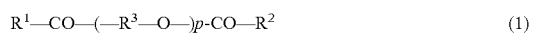

R$^1$—CO—(—R$^3$—O—)$p$-CO—R$^2$    (1)

In the formula (1), R$^1$ and R$^2$ each represent a C5-C10 (preferably C6-C10) organic group, R$^3$ represents an ethylene group, an isopropylene group, or a n-propylene group, and p represents an integer of 3 to 10.

Specific examples of the organic acid ester plasticizer include triethylene glycol-di-2-ethylbutyrate, triethylene glycol-di-2-ethylhexanoate, triethylene glycol dicaprylate, triethylene glycol di-n-octanoate, triethylene glycol-di-n-heptanoate, tetraethylene glycol-di-n-heptanoate, tetraethylene glycol-di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butyleneglycol di-2-ethylbutyrate, diethylene glycol-di-2-ethylbutyrate, diethylene glycol-di-2-ethylhexanoate, dipropylene glycol di-2-ethylbutyrate, triethylene glycol di-2-ethylpentanoate, tetraethylene glycol-di-2-ethylbutyrate, diethylene glycol dicaprylate, dihexyl adipate, dioctyl adipate, hexyl cyclohexyl adipate, diisononyl adipate, and heptylnonyl adipate. Examples further include oil-modified alkyd sebacate, mixtures of phosphoric acid esters and adipic acid esters, and mixed-type adipic acid esters prepared from C4-C9 alkyl alcohols and C4-C9 cyclic alcohols.

The organophosphate plasticizer is not particularly limited, and examples thereof include tributoxyethyl phosphate, isodecylphenyl phosphate, and triisopropyl phosphate.

Among the plasticizers, preferred is at least one selected from the group consisting of dihexyl adipate (DHA), triethylene glycol-di-2-ethylhexanoate (3GO), tetraethylene glycol-di-2-ethylhexanoate (4GO), triethylene glycol-di-2-ethylbutyrate (3GH), tetraethylene glycol-di-2-ethylbutyrate (4GH), tetraethylene glycol-di-n-heptanoate (4G7), and triethylene glycol-di-n-heptanoate (3G7). More preferred are triethylene glycol-di-2-ethyl butyrate (3GH), triethylene glycol-di-n-heptanoate (3G7), and triethylene glycol-di-2-ethylhexanoate (3GO), and still more preferred is triethylene glycol-di-2-ethylhexanoate.

The amount of the plasticizer relative to the polyvinyl acetal is not particularly limited. The lower limit of the amount of the plasticizer is preferably 5 parts by weight and the upper limit thereof is preferably 75 parts by weight, relative to 100 parts by weight of the polyvinyl acetal. With the amount of the plasticizer within the above range, the scattering prevention and the unevenness followability of the filling-bonding material are more likely to be both achieved.

When the amount is less than 5 parts by weight, the moldability of the filling-bonding material may be lowered. When the amount is more than 75 parts by weight, the transparency of the filling-bonding material may be lowered or the plasticizer may bleed out. The lower limit of the amount of the plasticizer is more preferably 10 parts by weight, still more preferably 15 parts by weight, particularly preferably 20 parts by weight. The upper limit of the amount of the plasticizer is more preferably 65 parts by weight, still more preferably 55 parts by weight. When the amount of the plasticizer relative to the polyvinyl acetal is larger, bubbles may generate in a high-temperature high-humidity environment, possibly lowering the optical quality. For suppressing lowering of the optical quality in a high-temperature high-humidity environment, the amount of the plasticizer relative to 100 parts by weight of the polyvinyl acetal is preferably 50 parts by weight or less. From this standpoint, the upper limit of the amount of the plasticizer is more preferably 40 parts by weight, particularly preferably 30 parts by weight.

Since the polyvinyl acetal generates the cohesive force, the amount of the plasticizer is preferably smaller. In other words, preferably, the compatibility between the polyvinyl acetal and the plasticizer is enhanced to reduce the amount of the plasticizer. This can improve the scattering prevention.

Preferably, the compatibility between the polyvinyl acetal and the plasticizer is enhanced, for example, by increasing the degree of acetalization or the acetyl group content of the polyvinyl acetal. Also preferably, the compatibility is enhanced by lowering the blocking tendency of hydroxy groups of the polyvinyl acetal. Blocking of hydroxy groups is preferably suppressed by lowering the aging temperature.

The amount of the polyvinyl acetal in the filling-bonding material of the present invention is preferably 50% by weight or more. When the amount is 50% by weight or more, the filling-bonding material is likely to achieve both scattering prevention and unevenness followability. The lower limit of the amount is more preferably 60% by weight, still more preferably 70% by weight, particularly preferably 80% by weight, most preferably 90% by weight.

The upper limit of the amount of the polyvinyl acetal is not particularly limited, and the amount may be 100% by weight.

The ethylene-vinyl acetate copolymer is not particularly limited, and is preferably one having a vinyl acetate content of 5 to 50% by weight.

The acid-modified olefin is not particularly limited, and examples thereof include acid-modified polypropylenes such as maleic anhydride-modified polypropylene, maleic acid-modified polypropylene, and acrylic acid-modified polypropylene.

The (meth)acrylic copolymer preferably has a glass transition temperature (Tg) of higher than the normal temperature (at around 23° C.). When the glass transition temperature (Tg) is lower than the normal temperature (at around 23° C.), molding of a thick material and a material in a shape with an uneven thickness may be difficult. The glass transition temperature herein refers to a temperature at which the loss tangent tan δ obtained by measurement of the dynamic viscoelasticity shows the maximum value. The tan δ can be calculated by dividing the loss modulus (G") by the storage modulus (G') which are measured using a viscoelastometer described later (tan δ=G'/G").

The (meth)acrylic copolymer preferably has a storage modulus at 20° C. of $1.0 \times 10^4$ Pa or higher. When the storage modulus is $1.0 \times 10^4$ Pa or higher, the filling-bonding material has an excellent cohesion force to have favorable processability, handleability, and shape retention properties. The lower limit of the storage modulus at 20° C. is more preferably $5.0 \times 10^4$ Pa.

The (meth)acrylic copolymer preferably has a storage modulus at 20° C. of $1.0 \times 10^6$ Pa or lower. When the storage modulus is $1.0 \times 10^6$ Pa or lower, the filling-bonding material has favorable initial adhesiveness (tackiness) that is needed for bonding. The upper limit of the storage modulus at 20° C. is more preferably $5.0 \times 10^5$ Pa.

The (meth)acrylic copolymer preferably has a storage modulus at 80° C. of $5.0 \times 10^4$ Pa or lower. When the storage modulus is $5.0 \times 10^4$ Pa or lower, the filling-bonding material heated upon lamination is fluidized in a predetermined time (e.g. in a few seconds to minutes) so as to follow the unevenness of the adherend and prevent formation of a gap.

The storage modulus of the (meth)acrylic copolymer can be adjusted by appropriately changing the type, molecular weight, and compounding ratio of the monomer constituting the (meth)acrylic copolymer, the degree of polymerization of the (meth)acrylic copolymer, and the type and compounding ratio of the plasticizer.

For example, the use of an ethylenic unsaturated monomer having an acidic group tends to increase the storage modulus. For another example, an increase in the amounts of an alkyl (meth)acrylate having an alkyl group containing 2 to 26 carbon atoms and a hydroxy alkyl (meth)acrylate having an alkyl group containing 4 or less carbon atoms tends to lower the storage modulus. For still another example, an increase in the amount of a (meth)acrylate containing an oxyethylene group, an oxypropylene group, or an oxybutylene group, or a group obtained by linking combinations of these tends to lower the storage modulus. For still another example, an increase in the degree of polymerization of the (meth)acrylic copolymer tends to increase the storage modulus.

The storage modulus of the (meth)acrylic copolymer can be measured using a dynamic viscoelastometer such as ARES-G2 (available from TA Instruments Japan Inc.) or DVA-200 (available from IT Measurement Co., Ltd.) under the condition of increasing the temperature from −50° C. to 100° C. at a rate of temperature rise of 3° C./min and the conditions of a frequency of 1 Hz and a shearing strain of 1%.

Examples of the silicone resin include a polymer having a main chain including a siloxane bond. Such a polymer can be obtained using, for example, a curable, non-curable, or half-cured (B-stage) polyorganosiloxane composition.

Examples of the curable polyorganosiloxane composition include those containing alkenyl group-containing polyorganosiloxane, polyorganohydrosiloxane, and a platinum catalyst (compounds of platinum group elements such as platinum, rhodium, and palladium). The curable polyorganosiloxane composition may further include a stabilizer, a diluent, a tackifier, an inorganic filler, and like agents.

The alkenyl group-containing polyorganosiloxane is a base polymer of the curable polyorganosiloxane composition and undergoes an addition reaction with the hydrosilyl group in the polyorganohydrosiloxane in the presence of the platinum catalyst to be crosslinked. The presence of the above component ensures a stable 3-dimensional structure owing to the crosslinking upon curing, controls the curing shrinkage, and ensures favorable optical characteristics.

Examples of the curing mechanism of the silicone resin include dehydration condensation between silanol groups, dehydrogenation condensation between a silanol group and a silicon atom-bonded hydrogen atom, dealcoholization condensation by a silicon atom-bonded alkoxy group and a silanol group, and deacetation condensation by a silicon atom-bonded acetoxy group and a silanol group. The examples also include hydrosilylation between a silicon atom-bonded alkenyl group and a silicon atom-bonded hydrogen atom. The examples further include radical reactions such as radical reaction by an acrylic group or a methacrylic group and radical reaction by an organic peroxide. The silicone resin can be obtained by any of these reactions. For example, a heat-curable silicone resin can be used.

The urethane resin is commonly a reaction product between a polyol component and a polyisocyanate component.

The polyol component is not particularly limited and is preferably a polyol component having an olefin skeleton. Examples of the polyol component having an olefin skeleton include polybutadiene polyols such as 1,2-polybutadiene polyol, polyisoprene polyols, and those obtained by saturating a double bond of any of the aforementioned polyols with hydrogen or a halogen. The polyol component may be a polyol obtained by copolymerizing any of the polybutadiene polyols with an olefin compound such as styrene, ethylene, vinyl acetate, or an acrylate, or a hydrogenated product thereof. The polyol component may have a linear or branched structure. These polyol components may be used alone or in combination of two or more thereof.

The number average molecular weight of the polyol component is not particularly limited, and is preferably 300 or more and 5,000 or less. When the number average molecular weight is less than 300, the polyol component and the polyisocyanate component are reacted too fast. As a result, molding of the filling-bonding material may be difficult and the produced filling-bonding material may be brittle due to lower flexibility. When the number average molecular weight is more than 5,000, the polyol component is excessively viscous. As a result, molding of the filling-bonding material may be difficult and the filling-bonding material may be clouded due to crystallization. The number average molecular weight is more preferably 500 or more and 3,000 or less.

The polyisocyanate component is not particularly limited, and is preferably a modified polyisocyanate obtained by reacting aliphatic and/or alicyclic polyisocyanate(s) having an isocyanate group and an ether compound having an ethylene oxide unit.

The use of the aliphatic and/or alicyclic polyisocyanate(s) can provide a filling-bonding material that is less colored and has high transparency. The preparation of a modified product by reaction with the ether compound having an ethylene oxide unit can suppress whitening of the polyisocyanate component owing to an action of the hydrophilic part (ethylene oxide unit) and exhibits compatibility with a low-polarity plasticizer owing to an action of a hydrophobic part (other unit(s)).

Examples of the aliphatic and/or alicyclic polyisocyanate(s) include hexamethylene diisocyanate, isophorone diisocyanate, and modified products thereof. Examples of the ether compound having an ethylene oxide unit include ethylene oxide adducts of alcohols, phenols, and/or amines. For increasing the hydrophilicity, those having six or more ethylene oxide units per molecule are preferred. The amount of the ethylene oxide unit relative to the whole urethane resin is preferably 1% by weight or more and 20% by weight or less.

The number of isocyanate groups per molecule of the modified polyisocyanate is preferably 2.0 or more on average. When the average of the number of isocyanate groups is less than 2.0, the reaction between the polyol component and the polyisocyanate component may be insufficient due to reduction of the crosslink density.

The urethane resin preferably has an α ratio (molar number of OH group derived from polyol component/molar number of NCO group derived from polyisocyanate component) of 1 or more. When the α ratio is less than 1, the polyisocyanate component is excessive relative to the polyol component. In such a case, the urethane resin is hard, possibly lowering the unevenness followability and adhesive force of the filling-bonding material. The α ratio more preferably satisfies $1<\alpha<2.0$. When the α ratio is 2.0 or more, the reaction between the polyol component and the polyisocyanate component may be insufficient.

The filling-bonding material of the present invention may further contain a reactive diluent and a photopolymerization initiator.

The use of the reactive diluent and the photopolymerization initiator enables the filling-bonding material to exhibit high unevenness followability (foaming prevention) upon lamination thereof and also improves the scattering prevention by causing crosslinking due to a photopolymerization reaction. In the case where photoirradiation is performed to react the reactive diluent after lamination of adherends, the reactive diluent does not remain or bleed out.

The reactive diluent herein refers to an agent that is compatible with the raw materials of the filling-bonding material of the present invention and is reacted between the reactive diluents by photoirradiation to be crosslinked and cured. The reactive diluent herein is not included in the plasticizer.

Examples of the reactive diluent include reactive diluents having a reactive double bond such as a monofunctional, bifunctional, or tri- or higher functional (meth)acrylic monomer or an oligomer thereof, and epoxy reactive diluents such as glycidyl ether. In particular, preferred is a reactive diluent having a reactive double bond because it is highly compatible with the raw materials of the filling-bonding material of the present invention and is easily crosslinked and cured when combined with a photopolymerization initiator.

The amount of the reactive diluent is not particularly limited. The lower limit thereof is preferably 0.5% by weight and the upper limit thereof is preferably 50% by weight. When the amount is less than 0.5% by weight, the filling-bonding material may not exhibit high unevenness followability (foaming prevention). When the amount is more than 50% by weight, the toughness, flexural stiffness, and adhesion force to glass or the like of the filling-bonding material may be lowered to lower the scattering prevention. The lower limit of the amount of the reactive diluent is more preferably 1% by weight and the upper limit thereof is more preferably 30% by weight. The lower limit is still more preferably 2% by weight and the upper limit is still more preferably 20% by weight. The lower limit is particularly preferably 4% by weight and the upper limit is particularly preferably 10% by weight.

The (meth)acrylic monomer usable as the reactive diluent having a reactive double bond is a monofunctional, bifunctional, or tri- or higher functional (meth)acrylic monomer.

Examples of the monofunctional (meth)acrylic monomer include methyl (meth)acrylate, ethyl (meth)acrylate, propyl (meth)acrylate, butyl (meth)acrylate, 2-hydroxy ethyl (meth)acrylate, diethylene glycol monoethyl ether (meth)acrylate, isobornyl (meth)acrylate, 3-methoxybutyl (meth)acrylate, 2-acryloyloxyethyl-2-hydroxypropylphthalate, and 2-methacryloyloxyethyl-2-hydroxylpropylphthalate.

Examples of the bifunctional (meth)acrylic monomer include ethylene glycol di(meth)acrylate, diethylene glycol di(meth)acrylate, tetraethylene glycol di(meth)acrylate, 1,6-hexanediol dimethacrylate, 1,9-nonandiol diacrylate, polytetramethyleneglycol di(meth)acrylate, neopentylglycol di(meth)acrylate, 1,3-butyleneglycol di(meth)acrylate, and 2,2-bis[4-(methacryloxyethoxy)phenyl]propane di(meth)acrylate.

Examples of the tri- or higher functional (meth)acrylic monomer include trimethylolpropane triacrylate, pentaerythritol triacrylate, pentaerythritol trimethacrylate, pentaerythritol tetramethacrylate, dipentaerythritol pentaacrylate, dipentaerythritol hexaacrylate, tri(2-acryloyloxyethyl) phosphate, tetramethyrolmethane tri(meth)acrylate, tetramethylol propane tetra(meth)acrylate, triallyl isocyanurate, and derivatives of these.

The (meth)acrylic monomer as the reactive diluent having a reactive double bond may be used alone, or two or more thereof may be used in combination. In particular, preferred is a monofunctional (meth)acrylic monomer because it is particularly highly compatible with the raw materials (in particular, polyvinyl acetal) of the filling-bonding material of the present invention. More specifically, preferred are methyl (meth)acrylate, ethyl (meth)acrylate, propyl (meth)acrylate, butyl (meth)acrylate, and 2-hydroxyethyl (meth)acrylate.

Examples of the (meth)acrylic oligomer as the reactive diluent having a reactive double bond include those obtained by linking the (meth)acrylic monomers. In particular, preferred is a (meth)acrylic oligomer prepared from the acrylic monomer because it is particularly highly compatible with the raw materials (in particular, polyvinyl acetal) of the filling-bonding material of the present invention.

The (meth)acrylic monomer also preferably contains a (meth)acrylate having a glycol skeleton.

The use of the (meth)acrylate having a glycol skeleton can provide a filling-bonding material having a low initial haze value, a low haze value after a high-temperature high-humidity test, and high transparency. The (meth)acrylate having a glycol skeleton is also excellent in compatibility with the raw materials of the filling-bonding material of the present invention and photoreactivity. Moreover, the use of the (meth)acrylate having a glycol skeleton can reduce the amount of double bonds in the filling-bonding material to lower the curing shrinkage upon curing.

Examples of the (meth)acrylate having a glycol skeleton include monofunctional (meth)acrylates, bifunctional (meth)acrylates, and tri- or higher functional (meth)acrylates. Specific examples of the monofunctional (meth)acrylates include methoxypolyethylene glycol (meth)acrylate, phenoxydiethylene glycol (meth)acrylate, and phenoxyhexaethylene glycol (meth)acrylate each containing 2 to 23 ethylene groups. The examples also include phenoxypolyethylene glycol (meth)acrylate containing 2 to 14 ethylene groups and methoxypolypropylene glycol (meth)acrylate containing 2 to 14 propylene groups. Examples of the bifunctional (meth)acrylates include polypropylene glycol diacrylate, diethylene glycol di(meth)acrylate containing 2 to 23 ethylene groups, ethoxylated bisphenol A diacrylate containing 2 to 14 ethylene groups, and polypropylene glycol diacrylate containing 2 to 14 propylene groups. Examples of the tri- or higher functional (meth)acrylates include EO-modified trimethyrolpropane tri(meth)acrylate, PO-modified trimethyrolpropane tri(meth)acrylate, and EO- and PO-modified trimethyrolpropane tri(meth)acrylate. The examples further include dipentaerythritol penta(meth)acrylate, dipentaerythritol hexa(meth)acrylate, and pentaerythritol tetra(meth)acrylate. Here, "EO" represents ethylene oxide and an EO-modified compound refers to a compound having a block structure of an ethylene oxide group. Also, "PO" represents propylene oxide and a PO-modified compound refers to a compound having a block structure of a propylene oxide group. These (meth)acrylates having a glycol skeleton may be used alone or in combination of two or more thereof.

Exemplary commercial products of the (meth)acrylate having a glycol skeleton include the following products available from Shin-Nakamura Chemical Co., Ltd: NK Ester series (AM-90G, AM-130G, M-90G, A-200, A-600, APG-400, APG-700, A-GLY-9E, A-TMPT-350, A-TMPT-950, A-TMPT-3PO, A-TMPT-6PO, and ATM-35E).

The (meth)acrylic monomer also preferably contains a phosphate ester (meth)acrylate.

The use of the phosphate ester (meth)acrylate can increase the tan δ value of the filling-bonding material while keeping the storage modulus high, leading to production of the filling-bonding material particularly excellent in impact resistance. Also, the filling-bonding material obtained is less colored and has high transparency. This is presumably because a phosphate (meth)acrylate, among the (meth)acrylic monomers, is highly compatible with the raw materials (in particular, polyvinyl acetal) of the filling-bonding material of the present invention. High compatibility between the phosphate (meth)acrylate and the raw materials of the filling-bonding material of the present invention further provides an effect of allowing the filling-bonding material to have a low viscosity and excellent photoreactivity.

The phosphate (meth)acrylate is not particularly limited, and preferred are phosphate (meth)acrylates represented by the following formula (2). These phosphate (meth)acrylates may be used alone or in combination of two or more thereof.

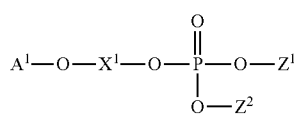

(2)

In the formula (2), $Z^1$ represents $A^2$-O—$X^2$—, a substituent having no polymerizable double bond, or a hydrogen atom and $Z^2$ represents $A^3$-O—$X^3$—, a substituent having no polymerizable double bond, or a hydrogen atom. $A^1$, $A^2$, and $A^3$ each represent an acryloyl group or a methacryloyl group, and $X^1$, $X^2$, and $X^3$ each represent an alkylene group, an alkyleneoxy group, an alkyleneoxy carbonyl group, an alkylene carbonyloxy group, or a combination of these.

Exemplary commercial products of the phosphate (meth)acrylate include 2-(methacryloyloxy)ethylphosphate (SR9050 available from Sartomer), tris[2-(methacryloyloxy)ethyl] phosphate (SR9051 available from Sartomer), and tris[2-(acryloyloxy)ethyl] phosphate (SR9053 available from Sartomer). Further, KAYAMER series available from Nippon Kayaku Co., Ltd. and Phosmer series available from Uni-Chemical Co., Ltd. may also be mentioned.

In the case where the filling-bonding material of the present invention contains the (meth)acrylate having a glycol skeleton or the phosphate (meth)acrylate, a reactive diluent having a reactive double bond other than these may be used together.

The photopolymerization initiator may be appropriately selected according to the type of the reactive diluent. For example, in the case where the reactive diluent used is a monofunctional, bifunctional, or tri- or higher functional (meth)acrylic monomer or an oligomer thereof, usable are a benzoin compound, an alkylphenone compound, a thioxanthone compound, an acetophenone compound, an acylsulfine compound, a persulfate, an organic peroxide, and an azo compound. These photopolymerization initiators may be used alone or in combination of two or more thereof.

The amount of the photopolymerization initiator is not particularly limited. The lower limit of the amount is preferably 0.01 parts by weight and the upper limit thereof is preferably 5 parts by weight, relative to 100 parts by weight of the reactive diluent. When the amount of the photopolymerization initiator is less than 0.01 parts by weight, the reactive diluent may not be reacted sufficiently or the reaction may take a long time. Even when the amount of the photopolymerization initiator is more than 5 parts by weight, the reactivity is not any more improved. It may rather give a trouble such as bleeding of the photopolymerization initiator. The lower limit of the amount of the photopolymerization initiator is more preferably 0.1 parts by weight and the upper limit thereof is more preferably 2 parts by weight.

The double bond content of the filling-bonding material of the present invention is preferably 2.9 mmol/g or less in all the compounds except for the photopolymerization initiator. In such a case, the curing shrinkage ratio upon curing can be lowered to reduce the occurrence of variation in thickness and colors caused by curing shrinkage. The occurrence of such variation in thickness and colors (in particular, variation in colors on the side in contact with the display device) causes lowering of the display performance of the display device. The upper limit of the double bond content is more preferably 2.4 mmol/g, still more preferably 2.2 mmol/g.

The lower limit of the double bond content is not particularly limited, and is preferably 1.5 mmol/g or more. In such a case, the filling-bonding material can have better unevenness followability and scattering prevention. The lower limit of the double bond content is more preferably 1.7 mmol/g, still more preferably 2.0 mmol/g.

The double bond content herein can be calculated from the amount and molecular weight of each compound having a double bond in all the compounds other than the photopolymerization initiator contained in the filling-bonding material of the present invention. The double bond content can be also calculated by a method of determining the iodine number by a technique in conformity with JIS K 0070 and calculating the double bond content based on the obtained value. Further, the double bond content can be also determined by a method of analyzing the composition of the filling-bonding material using a gas chromatograph-mass spectrometer (GC-MS) and calculating the double bond content from the amount and molecular weight of the compound having a double bond.

The curing shrinkage ratio upon curing (when the reactive diluent is reacted by photoirradiation) of the filling-bonding material of the present invention is not particularly limited, and is preferably 2% or lower. With the curing shrinkage ratio of 2% or lower, the occurrence of variation in thickness and colors (in particular, variation in colors on the side in contact with the display device) caused by curing shrinkage, which may lead to lowering of the display performance of the display device, can be reduced. The curing shrinkage ratio is more preferably 1% or lower.

The curing shrinkage ratio herein can be calculated using the density (dl) of the filling-bonding material before the photoirradiation and the density (df) of the filling-bonding material after the photoirradiation. The densities of the filling-bonding material before and after the photoirradiation can be measured in conformity with JIS K7112 using a high-precision electronic densimeter (SD-200L available from Alfa Mirage) or a high-precision dry automatic pycnometer (Accupyc II 1340-1CC available from Micromeritics Instrument Corp). The curing shrinkage ratio can be calculated by the following equation.

Curing shrinkage ratio (%)=($df$-$dl$)/$df$×100

The filling-bonding material of the present invention may further contain an ultraviolet absorber.

The use of the ultraviolet absorber can improve the light resistance of the filling-bonding material. In particular, in the case where the ultraviolet absorber used does not absorb light (UV rays) at a wavelength with which the reactive diluent reacts and absorbs light (UV rays) at a wavelength that is different from the wavelength with which the reactive diluent reacts, the reaction of the reactive diluent is not disturbed. Examples of such an ultraviolet absorber include malonic acid ester ultraviolet absorbers and oxanilide ultraviolet absorbers.

The filling-bonding material of the present invention may optionally contain known additives such as an adhesion modifier, a tackifier resin, a plasticizer, an emulsifier, a softener, fine particles, a filler, a pigment, a dye, a silane coupling agent, an antioxidant, a surfactant, or a wax.

The filling-bonding material of the present invention preferably has a glass transition temperature (Tg) of 10° C. or higher. When the glass transition temperature (Tg) is 10° C. or higher, the filling bonding material is excellent in handleability without exhibiting unnecessary adhesiveness during transport or use thereof. The lower limit of the glass transition temperature (Tg) is more preferably 15° C., still more preferably 20° C. The filling-bonding material of the present invention has a glass transition temperature (Tg) of 60° C. or lower. When the glass transition temperature (Tg) is 60° C. or lower, bonding does not need to be performed at high temperature and can be performed at relatively low temperature, suppressing damage by heat to the parts to be bonded (adherends). The upper limit of the glass transition temperature (Tg) is more preferably 50° C., still more preferably 40° C.

The glass transition temperature herein refers to a temperature at which the loss tangent (tan δ) measured by the dynamic viscoelasticity measurement shows the maximum value. The tan δ can be calculated from the storage modulus (G') and loss modulus (G") measured using a dynamic viscoelastometer under the condition of increasing the temperature from −50° C. to 100° C. at a rate of temperature rise of 3° C./min and the conditions of a frequency of 1 Hz and a shearing strain of 1% (tan δ=G'/G").

The filling-bonding material of the present invention preferably has a storage modulus at 20° C. of $1\times10^4$ Pa or higher.

With the storage modulus at 20° C. within the above range, molding or processing of the filling-bonding material at normal temperature is facilitated and the filling-bonding material can maintain its shape with an uneven thickness at normal temperature. Pressure bonding with heat allows the filling-bonding material to sufficiently follow the unevenness formed by decorative printing portions (unevenness formed by printing portions on the rear side of the surface protection panel) or the unevenness formed by wiring (unevenness formed by wiring formed on the touch panel). Moreover, an effect of suppressing scattering of fragments of glass or the like can be expected when the optical device or the like is damaged by drop impact or the like. The storage modulus at 20° C. is more preferably $2\times10^5$ Pa or higher, still more preferably $1\times10^6$ Pa or higher, furthermore preferably $1\times10^7$ Pa or higher, particularly preferably $3\times10^7$ Pa or higher.

The upper limit of the storage modulus at 20° C. is not particularly limited, and is preferably $1\times10^{10}$ Pa. When the storage modulus at 20° C. is more than $1\times10^{10}$ Pa, the filling-bonding material may be too hard, possibly having lower adhesiveness or handleability. The upper limit of the storage modulus at 20° C. is more preferably $1\times10^9$ Pa.

The filling-bonding material of the present invention preferably has a storage modulus at 80° C. of $1\times10^6$ Pa or lower. When the storage modulus at 80° C. is higher than $1\times10^6$ Pa, the filling-bonding material may fail to follow the deforming stress even with heating upon lamination, possibly causing bubbles remaining at the unevenness portions. The upper limit of the storage modulus at 80° C. is more preferably $9\times10^5$ Pa, still more preferably $7\times10^5$ Pa, particularly preferably $5\times10^5$ Pa.

The lower limit of the storage modulus at 80° C. is not particularly limited, and is preferably $1\times10^3$ Pa. When the storage modulus at 80° C. is less than $1\times10^3$ Pa, the heat-resistant mechanical strength as the filling-bonding material may not be maintained. The lower limit of the storage modulus at 80° C. is more preferably $1\times10^4$ Pa, still more preferably $5\times10^4$ Pa, particularly preferably $1\times10^5$ Pa.

The filling-bonding material of the present invention having such properties in relation to the modulus of elasticity can easily fill the interlayer space with heat at around 80° C. upon lamination and has excellent handleability. Pressurization along with the heating can further facilitate filling of the interlayer space.

The storage modulus of the filling-bonding material can be measured using a dynamic viscoelastometer such as ARES-G2 (available from TA Instruments Japan Inc.) or DVA-200 (available from IT Measurement Co., Ltd.) under the condition of increasing the temperature from −50° C. to 100° C. at a rate of temperature rise of 3° C./rain and the conditions of a frequency of 1 Hz and a shearing strain of 1%.

The storage modulus of the filling-bonding material of the present invention is preferably adjusted by a method of using a plasticized polyvinyl acetal as described above in the filling-bonding material of the present invention and adjusting the degree of acetalization, hydroxy group content, acetyl group content, average degree of polymerization, and molecular weight of the polyvinyl alcohol used and the amount of the plasticizer.

More specifically, when the amount of the plasticizer is increased or the compatibility of the plasticizer with the polyvinyl acetal is enhanced, the storage modulus is reduced. When the amount of the plasticizer is decreased or the compatibility of the plasticizer with the polyvinyl acetal is lowered, the storage modulus is increased. The storage modulus can be increased also by increasing the molecular weight of the polyvinyl acetal and the storage modulus can be reduced by decreasing the molecular weight of the polyvinyl acetal. The storage modulus can be increased by increasing the glass transition temperature (Tg) and reduction of the storage modulus is significant when the Tg is lower than 20° C.

The filling-bonding material of the present invention preferably has a visible light transmittance at the light transmitting portion of 80% or higher. The visible light transmittance of 80% or higher can prevent reduction in visibility of the content displayed on the optical device caused by reduction of the transmittance at a thick portion or insufficient brightness of the optical device which make the viewer to feel that the display is in low light. The lower limit of the visible light transmittance at the light transmitting portion is more preferably 85%, still more preferably 90%.

The filling-bonding material of the present invention preferably has a haze at the light transmitting portion of 1% or lower. With the haze of 1% or lower, reduction in visibility or vividness which causes blurry display on the optical device can be prevented. The filling-bonding material of the present invention preferably has a visible light transmittance of 80% or higher and a haze of 1% or lower at the light transmitting portion. The upper limit of the haze at the light transmitting portion is more preferably 0.5%, still more preferably 0.3%.

The visible light transmittance and the haze can be measured in conformity with JIS R 3106: 1998 and JIS K 7136: 2000, respectively, using a spectrophotometer U4100 available from Hitachi High-Technologies Corporation, or the like. The haze can be calculated from the total light transmittance (Tt) and the diffusion light transmittance (Td). Specifically, the haze is calculated as a value obtained by dividing the diffusion light transmittance (Td) by the total light transmittance (Tt) (haze=Td/Tt).

The filling-bonding material of the present invention preferably has a refractive index at 23° C. at the light transmitting portion of 1.40 or higher and 1.60 or lower.

With such a refractive index, the refractive index difference at the interface between the filling-bonding material and the adherend is small particularly in the case where the adherend is glass, so that the optical quality of the optical device is not so much lowered. The refractive index at 23° C. at the light transmitting portion is more preferably within a range of 1.45 or more and 1.55 or less.

The value of the refractive index refers to a value at the measurement wavelength of 589 nm (sodium D line). The refractive index can be measured in conformity with JIS K 7142 using, for example, an Abbe refractometer (e.g., universal Abbe refractometer ER-7MW available from Erma Inc.).

The refractive index can be adjusted by changing the composition (number of parts by weight) of the raw materials constituting the filling-bonding material. For example, in the case where a polyvinyl acetal is used as a main raw material of the filling-bonding material, the refractive index can be adjusted by changing the number of parts by weight of the added plasticizer.

The filling-bonding material of the present invention preferably has an average residual phase difference (Rave) at the light transmitting portion of 20 nm/mm or less. With the average residual phase difference of 20 nm/mm or less, reduction in the optical quality (specifically, occurrence of bright spot, dark spot, or color irregularity) of the optical device can be prevented. The upper limit of the average residual phase difference at the light transmitting portion is more preferably 10 nm/mm, particularly preferably 5 nm/mm.

The residual phase difference (R1) refers to a ratio between the phase difference (R0) at a specific point of the filling-bonding material and the thickness (D) at that point (R1=R0/D). The average residual phase difference (Rave) is obtained by dividing the target region (light transmitting portion) into 100 sections in a plan view in the optical axis direction and calculating the average of the residual phase differences measured in the respective divided regions. The phase difference (R0) can be measured with light at a wavelength of 520 nm using PA-200 available from Photonic Lattice, Inc.

The filling-bonding material of the present invention preferably has an in-plane standard deviation (s) of the phase difference at the light transmitting portion of 10 or less. With the in-plane standard deviation of the phase difference of 10 or less, reduction in the optical quality (specifically, occurrence of bright spot, dark spot, or color irregularity) of the optical device can be prevented. The upper limit of the in-plane standard deviation of the phase difference at the light transmitting portion is more preferably 5, particularly preferably 3.

The in-plane standard deviation (s) of the phase difference is obtained by dividing the target region (light transmitting portion) into at least 50,000 sections in a plan view in the optical axis direction and calculating the standard deviation of the phase differences (R0) measured in the respective divided regions.

The average residual phase difference (Rave) and the in-plane standard deviation (s) of the phase difference can be adjusted by adjusting the molding temperature or the molding pressure in the molding of the filling-bonding material to adjust the flowability. For example, a high molding temperature increases the flowability of the resin to lower the residual phase difference or the in-plane standard deviation of the phase difference. Heating (annealing) of the molded filling-bonding material in a mold of the same size and adjustment of the heating time lower the residual phase difference and the in-plane standard deviation of the phase difference.

The filling-bonding material of the present invention may be produced by any method as long as the filling-bonding material in the shape with an uneven thickness can be produced. Examples of the method include injection molding. Examples further include a method of producing a sheet-shaped filling-bonding material and then performing sheet press molding and a method of producing a thick sheet-shaped filling-bonding material and then cutting the obtained material out using laser or waterjet. Examples further include a method of press molding a powder mixture of the compounding materials or a pellet of the powder mixture, a method of producing a sheet-shaped filling-bonding material and stretch-molding the obtained material, and a method of directly extrusion molding the compounding materials. Preferred among these are injection molding and direct extrusion molding.

As described above, the shape with an uneven thickness may be obtained by separately molding parts (blocks) and finally bonding the blocks together. The blocks may be bonded together into the shape with an uneven thickness by applying or impregnating a liquid bonding aid to each block and holding the blocks for a certain period of time under heat and pressure.

The application of the filling-bonding material of the present invention is not particularly limited, and is favorably used to fill a space between parts, while bonding them, in optical devices in various shapes not limited to flat shapes.

Examples of the optical devices include personal digital assistants (e.g., smartphones, tablet PCs), display devices (e.g., electronic paper, PDAs, TVs, game machines) equipped with image display panels such as LCDs, ELs, or PDPs, light-emitting devices (e.g., illumination lamps), and light-receiving devices (e.g., solar cells, image sensors).

Examples of the space between parts to be filled with the filling-bonding material of the present invention include a space between a touch panel module and a surface protection panel, a space between a touch panel module and a polarizing film, and a space between transparent conductive films included in the touch panel.

The touch panel module is not particularly limited, and may be one commonly used for a display device such as a touch panel including multiple layers (e.g., ITO film). The structure of the touch panel module is not particularly limited, and examples thereof include out-cell type structure, in-cell type structure, on-cell type structure, cover glass-integrated type structure, and cover sheet-integrated type structure. The system of the touch panel module is not particularly limited, and examples thereof include resistive film type, electrostatic capacitance type, optical type, and ultrasonic wave type.

The surface protection panel is not particularly limited, and may be one commonly used for optical devices or display devices, such as a glass plate, a polycarbonate plate, or an acrylic plate.

The filling-bonding material of the present invention can be directly laminated to the adherend in the case where it is constituted by self-adhesive materials. Even in the case where the filling-bonding material of the present invention is not tacky or adhesive at normal temperature, it becomes adhesive by heating to the glass transition point (Tg) or higher to be able to be directly laminated to the adherend. For example, appropriate adjustment of the heating temperature, pressure, and treatment time using a heating vacuum laminator or an autoclave enables lamination of the filling-bonding material to the adherend.

The filling-bonding material of the present invention may be colored, for example, black according to the application, and is preferably a transparent filling-bonding material. The filling-bonding material that is a transparent filling-bonding material can be favorably used for applications that require high transparency in optical devices or the like. The transparent filling-bonding material may be clear and colorless or highly clear and colored. Exemplary cases of being clear and colored include blue and transparent.

The filling-bonding material of the present invention may be only partly colored and may include both a clear, colorless portion and a colored portion (clear, colored portion).

Being clear and colored, the filling-bonding material of the present invention can provide a higher-design device or adjust the color tone of the light passing through the filling-bonding material.

In the case where the filling-bonding material of the present invention is clear and colored, the visible light transmittance thereof is not particularly limited and is preferably 85% or lower. With the visible light transmittance of 85% or lower, the color tone of the light passing through the filling-bonding material can be adjusted, while the color is visible. The visible light transmittance is more preferably 60% or lower. The lower limit of the visible light transmittance is not particularly limited, and is preferably 1% or higher.

Preferably, the filling-bonding material of the present invention at least partly has a light-shielding portion or a light-scattering portion.

The presence of the light-shielding portion or the light-scattering portion in the filling-bonding material of the present invention enables masking by the light-shielding portion or the light-scattering portion.

Conventionally, there has been a case where a printing portion is formed at the periphery on the rear side of the surface protection panel for the purpose of masking or the like. More specifically, in the case where the touch panel module and the surface protection panel are laminated to each other, there have been a case where a printing portion is formed on the rear side of the surface protection panel for masking a chassis provided at the periphery of the touch panel module. However, in the case where a curved glass plate is used as the surface protection panel, curving of a flat glass plate after performing decorative printing is not possible because curving of a glass plate requires high temperature, and decorative printing on a curved glass plate is very difficult. The presence of the light-shielding portion or the light-scattering portion in the filling-bonding material of the present invention enables masking by the light-shielding portion or the light-scattering portion in the filling-bonding material of the present invention without providing a printing portion on the rear side of the surface protection panel.

The presence of the light-shielding portion or the light-scattering portion in the filling-bonding material of the present invention improves the design, suppressing reduction of the visibility due to leakage of light or reflected light in the optical device, and makes scratches inconspicuous.

The light-shielding portion preferably has a visible light transmittance of 10% or lower. With the visible light transmittance of 10% or lower, the light-shielding portion moderately blocks light, facilitating masking or the like. In addition, it can improve the design, suppress reduction of the visibility due to leakage of light or reflected light in the optical device, and make scratches inconspicuous. The visible light transmittance is more preferably 5% or lower, still more preferably 1% or lower.

The lower limit of the visible light transmittance of the light-shielding portion is not particularly limited, and is preferably 0.01% or higher.

The light-scattering portion preferably has a haze of 10% or higher. With the haze of 10% or higher, the light-scattering portion moderately scatters light, facilitating masking, improving the design, and making scratches inconspicuous. The haze is more preferably 15% or higher.

The haze of the light-scattering portion may be adjusted within the above range by any method. Specifically, for example, addition of calcium carbonate particles or the like to the filling-bonding material for scattering visible light increases the haze, while maintaining high visible light transmittance. Thus, a masking effect can be achieved.

In the case of having the light-shielding portion or the light-scattering portion, the filling-bonding material of the present invention preferably further has a transparent portion. The transparent portion may be a clear, colorless portion or a colored portion (clear, colored portion).

The visible light transmittance of the filling-bonding material can be measured in conformity with JIS R 3106: 1998. Specifically, for example, the filling-bonding material in a thickness of 200 μm is press-formed as a measurement sample, the sample is sandwiched between two white glass plates (S9112 available from Matsunami Glass Ind., Ltd.), and the visible light transmittance is measured using U4100 (available from Hitachi High-Technologies Corporation).

The haze of the filling-bonding material can be measured in conformity with JIS K 7136: 2000 (ISO 14782: 1999). Specifically, for example, the filling-bonding material in a thickness of 200 μm is press-formed as a measurement sample, the sample is sandwiched between two white glass plates (S9112 available from Matsunami Glass Ind. Ltd.), and the haze is measured using NDH4000 (available from Nippon Denshoku Industries Co., Ltd.).

The light-shielding portion and the light-scattering portion are preferably adjusted to transmit UV rays by adjusting the UV transmittance. In the case where UV rays are transmitted, photocuring of the filling-bonding material is not disturbed, while the light-shielding portion and the light-scattering portion have better masking properties.

The light-shielding portion and the light-scattering portion are only required to be provided in at least a part of the filling-bonding material of the present invention, and their positions are not particularly limited. In particular, the light-shielding portion and the light-scattering portion are preferably provided at the periphery of the filling-bonding material of the present invention. When the light-shielding portion or the light-scattering portion is provided at the periphery of the filling-bonding material of the present invention, masking of the chassis provided at the periphery of the touch panel module can be performed without providing a printing portion on the rear side of the surface protection panel upon lamination of the touch panel module and the surface protection panel. The light-shielding portion may be provided on an end face of the filling-bonding material of the present invention.

The light-shielding portion and the light-scattering portion may be provided at the center of the filling-bonding material of the present invention. The light-shielding portion or the light-scattering portion provided at the center of the filling-bonding material of the present invention can be used as a "partition" of the display screen.

In the case where the polyvinyl acetal is contained, the average degree of polymerization of polyvinyl alcohol in the light-shielding portion and the light-scattering portion may be different from that of other parts, or the degree of crosslinking in the light-shielding portion or the light-scattering portion may be different from that of other parts. In particular, in the case where the light-shielding portion or the light-scattering portion is provided at the periphery of the filling-bonding material, a higher average degree of polymerization or a higher degree of crosslinking of polyvinyl alcohol in the light-shielding portion or the light-scattering portion compared to those in other parts can increase the heat resistance of the device.

The colored portion, the light-shielding portion, and the light-scattering portion each may be in monotonous colors or colors with gradation, or have a pattern such as a dot pattern. The colored portion, the light-shielding portion, or the light-scattering portion in colors with gradation or having a pattern such as a dot pattern can further improve the design.

The visible light transmittance, haze, UV transmittance, and color of the colored portion, the light-shielding portion, and the light-scattering portion can be adjusted by any method. In an exemplary method, the portion may contain a dye or a pigment. The dye or the pigment is not particularly limited. Examples of the pigment include inorganic pigments such as carbon black, titanium oxide, and calcium carbonate and nitro pigments, nitroso pigments, azo pigments, and phthalocyanine pigments. Examples of the dye include azo dyes, anthraquinone dyes, and phthalocyanine dyes. These dyes or pigments may be used alone or in combination of two or more thereof.

The amount of the dye or the pigment is not particularly limited, and may be appropriately adjusted according to the application.

In the case where the filling-bonding material of the present invention has the colored portion, the light-shielding portion, or the light-scattering portion, the filling-bonding material of the present invention can be produced, for example, by two-color injection molding using different materials. In another exemplary method, a block having a light-shielding portion or a light-scattering portion and a block not having a light-shielding portion or a light-scattering portion are separately formed, and the blocks are finally bonded to each other.

FIG. 6 shows cross-sectional views schematically illustrating an exemplary filling-bonding material of the present invention and an exemplary embodiment thereof.

In FIG. 6(a), the filling-bonding material 1 of the present invention fills the space between the flat touch panel module 2 and the curved surface protection panel 3, while bonding them. The filling-bonding material 1 of the present invention is processed to have a shape following the unevenness of the chassis 21 provided at the periphery of the touch panel module 2.

In FIG. 6(b), the filling-bonding material 1 of the present invention has a light-shielding portion 11 at the periphery. The light-shielding portion 11 enables masking of the chassis 21 of the touch panel module 2 without formation of a printing portion on the rear side of the surface protection panel 3.

FIG. 7 shows perspective views each schematically illustrating an exemplary filling-bonding material of the present invention having a light-shielding portion.

The filling-bonding material 1 of the present invention shown in each of FIGS. 7(a) and 7(c) has a shape including a flat surface and a convex surface facing the flat surface (convex lens shape) and has the light-shielding portion 11 on the periphery.

The filling-bonding material 1 of the present invention shown in FIG. 7(b) has a shape including a flat surface and a convex surface facing the flat surface (convex lens shape) and has the light-shielding portions 11 not only at the periphery but also at the center.

The filling-bonding material 1 of the present invention shown in each of FIGS. 7(d) and 7(e) is a semi-sphere (ellipsoid) and has the light-shielding portion 11 at the periphery.

The present invention also encompasses a protective sheet-equipped filling bonding material including the filling-bonding material of the present invention and a protective sheet covering the filling-bonding material of the present invention. Such a structure can prevent contamination from its production to the time of use.

The protective sheet is not particularly limited. In the case where the filling-bonding material of the present invention contains the polyvinyl acetal, examples of the raw material of the protective sheet include a polyolefin resin.

In the protective sheet-equipped filling-bonding material of the present invention, the 180° peel strength between the filling-bonding material of the present invention and the protective sheet at 25° C. is preferably 3 N/25 mm or less, more preferably 1 N/25 mm or less.

The protective sheet-equipped filling-bonding material of the present invention can be produced, for example, by two-color injection molding using different materials.

FIG. 8 shows a perspective view schematically illustrating an exemplary protective sheet-equipped filling-bonding material of the present invention.

As illustrated in FIG. 8, a protective sheet-equipped filling-bonding material 6 of the present invention includes the filling-bonding material 1 of the present invention and a protective sheet 5 covering the filling-bonding material 1 of the present invention.

The present invention also encompasses a laminate including a pair of bonded parts (adherends) and the filling-bonding material of the present invention, wherein the filling-bonding material of the present invention fills a space between the pair of bonded parts.

The bonded parts may have curved surfaces, and the filling-bonding material of the present invention is preferably in the shape with an uneven thickness according to the surface shapes of the bonded parts. Such a structure reduces the stress applied to the bonded parts compared to the case where flat parts are bonded by application of a stress, suppressing lowering of the optical quality due to a strain.

The present invention also encompasses an optical device including the laminate of the present invention, wherein the pair of bonded parts includes at least one transparent part, and the transparent part and the filling-bonding material of the present invention have a difference in refractive index of 0.03 or less.

Examples of the transparent part include a surface protection panel as described above.

With the difference in refractive index between the transparent part and the filling-bonding material of the present invention within the above range, light loss or misaligned images at the interface having the difference in refractive index can be suppressed, leading to satisfactory optical quality of the device produced using a part having a curved surface. The difference in refractive index is more preferably 0.02 or less.

The difference in refractive index between the transparent part and the filling-bonding material can be obtained using an Abbe refractometer (e.g., universal Abbe refractometer ER-7MW available from Erma Inc.) under the conditions of a measurement wavelength of 589 nm (sodium D line) and a measurement temperature of 20° C.

The filling-bonding material of the present invention can be used for a protective panel for an optical device.

The protective panel for an optical device may be a protective panel for an optical device, including a first panel, a second panel, and the filling-bonding material of the present invention, wherein at least one of the first panel and the second panel has a curved surface, and the first panel and the second panel are directly bonded to each other using the filling-bonding material of the present invention. The present invention also encompasses such a protective panel for an optical device.

The use of such a protective panel for an optical device enables production of optical devices in various shapes not limited to flat shapes using conventional flat display modules or touch panel modules. Such a protective panel for an optical device has better handleability and the use thereof facilitates bonding, compared to the case of using a surface protection panel made of, for example, a large curved glass.

At least one of the first panel and the second panel has a curved surface. Examples of the panel having a curved surface include a curved panel. Preferably, one of the first panel and the second panel has a curved surface and the other has a flat surface. With such a structure, an optical device having a curved surface as the outermost surface can be easily obtained even in the case of using a conventional display module or a touch panel module which commonly have flat shapes. For example, one with a flat surface of the first panel and the second panel can be laminated, on its flat portion, to an adherend (display module or touch panel module) having a flat shape using a conventional adhesive or the like. The first panel and the second panel both may have a curved surface.

The first panel and the second panel may be prepared from any materials, and the first panel and the second panel may be prepared from the same or different materials. Specifically, those commonly used as a surface protection panel in an optical device or a display device, such as a glass plate, a polycarbonate plate, or an acrylic plate, can be used. To any of these surface protection panels may be laminated a touch panel module. In particular, at least one of the first panel and the second panel is preferably a glass plate. Both the first panel and the second panel may be glass plates.

In the protective panel for an optical device of the present invention, the panel with a curved surface, of the first panel and the second panel, and the filling-bonding material of the present invention preferably have a difference in refractive index of 0.1 or less.

With the difference in refractive index within the above range, light loss or misaligned images at the interface having the difference in refractive index can be suppressed, leading to satisfactory optical quality of the device produced using a part having a curved surface. The difference in refractive index is more preferably 0.05 or less.

The refractive index can be obtained using an Abbe refractometer (e.g., universal Abbe refractometer ER-7MW available from Erma Inc.) under the conditions of a measurement wavelength of 589 nm (sodium D line) and a measurement temperature of 20° C.

In the protective panel for an optical device of the present invention, the filling-bonding material of the present invention preferably has a storage modulus at 23° C. of 1 MPa or higher from the standpoint of reworkability. With the storage modulus at 23° C. within the above range, the filling-bonding material is less likely to be broken when the protective panel for an optical device is reworked. The storage modulus at 23° C. is more preferably 10 MPa or higher, still more preferably 20 MPa or higher.

In the protective panel for an optical device of the present invention, the filling-bonding material of the present invention preferably has a tensile strength at break of 1 MPa or higher.

With the tensile strength at break within the above range, the filling-bonding material is less likely to be broken when the protective panel for an optical device is reworked. The tensile strength at break is more preferably 5 MPa or higher, still more preferably 10 MPa or higher.

The tensile strength at break can be obtained by measuring a dumbbell-shaped specimen (Type 3) at a rate of 100 ram/min using, for example, a TENSILON universal testing machine available from Orientec Co., Ltd. at 23° C. and 50% RH.

In the protective panel for an optical device of the present invention, the filling-bonding material of the present invention having a thickness of 200 μm preferably has a 180° peel strength at 300 mm/min of 5 N/25 mm or higher when laminated to glass.

With the 180° peel strength within the above range, the filling-bonding material is less likely to be broken when the protective panel for an optical device is reworked. The 180° peel strength is more preferably 10 N/25 mm or higher, still more preferably 15 N/25 mm or higher.

The upper limit of the 180° peel strength is not particularly limited, and is preferably 200 N/25 mm. When the 180° peel strength is higher than 200 N/25 mm, recycling of the protective panel for an optical device is difficult because detachment of the first panel or the second panel from the filling-bonding material is difficult due to the excessive strength. The upper limit of the 180° peel strength is more preferably 200 N/25 mm.

The 180° peel strength can be obtained by measurement performed on a sheet-shaped filling-bonding material (thickness: 200 μm, width: 25 mm) bonded to the adherend at a tensile speed of 300 mm/min using a TENSILON universal testing machine available from Orientec Co., Ltd. at 23° C. and 50% RH.

FIG. 9 shows views each schematically illustrating an exemplary protective panel for an optical device of the present invention.

A protective panel for an optical device 32 shown in FIG. 9(a) (perspective view) and FIG. 9(b) (cross-sectional view) includes a first panel 31a and a second panel 31b directly bonded to each other using the filling-bonding material 1. The filling-bonding material is in the shape having a flat surface and a convex surface facing the flat surface (convex lens shape) and fills a space between the first panel 31a (with a curved surface) and the second panel 31b (in a flat shape), while bonding them.

FIG. 10 shows views each schematically illustrating an exemplary protective panel for an optical device of the present invention.

The protective panel for an optical device 32 shown in FIG. 10(a) (perspective view) and FIG. 10(b) (cross-sectional view) includes the first panel 31a and the second panel 31b directly bonded to each other using the filling-bonding material 1. The filling-bonding material 1 is in the shape having a flat surface and a concave surface facing the flat surface (concave lens shape) and fills a space between the first panel 31a (with a curved surface) and the second panel 31b (in a flat shape), while bonding them.

FIG. 11 shows views each schematically illustrating an exemplary protective panel for an optical device of the present invention.

The protective panel for an optical device 32 shown in FIG. 11(a) (perspective view) and FIG. 11(b) (cross-sectional view) includes the first panel 31a and the second panel 31b directly bonded to each other using the filling-bonding material 1. The filling-bonding material 1 is in the shape in which curved surfaces face each other, and fills a space between the first panel 31a (with a curved surface) and the second panel 31b (with a curved surface), while bonding them. The curved surfaces facing each other to constitute the filling-bonding material 1 may have the same or different curvatures.

FIG. 12 shows a view schematically illustrating an exemplary protective panel for an optical device of the present invention.

The protective panel for an optical device 32 shown in FIG. 12 includes the first panel 31a to which the touch panel module 2 is laminated and the second panel 31b bonded to each other using the filling-bonding material 1. As shown in FIG. 12, to the first panel 31a may be laminated the touch panel module 2.

FIG. 13 shows a view schematically illustrating an exemplary embodiment of the protective panel for an optical device of the present invention.

The protective panel for an optical device 32 shown in FIG. 13 includes the first panel 31a to which the touch panel module 2 is laminated and the second panel 31b bonded to each other using the filling-bonding material 1. As shown in FIG. 13, the protective panel for an optical device 32 is laminated to the display module 9 using a bond or adhesive 8. An optical device 7 is constituted by the protective panel for an optical device 32 and the display module 9. The protective panel for an optical device 32 and the display module 9 may be fixed to each other by a mechanical method such as engagement or screwing, without using the bond or adhesive 8.

The protective panel for an optical device of the present invention may be produced, for example, by the following method. Specifically, the first panel and the second panel are each processed to a desired shape in advance (e.g., the first panel is processed as a panel with a curved surface and the second panel is processed as a panel in the flat shape), and the first panel, the filling-bonding material of the present invention, and the second panel are stacked, followed by heat treatment in a heating vacuum laminator or an autoclave.

In an exemplary method for producing the protective panel for an optical device of the present invention, either one of the first panel and the second panel may be curved upon direct bonding of the first panel and the second panel to each other using the filling-bonding material of the present invention.

FIG. 14 shows a view schematically illustrating an exemplary method for producing the protective panel for an optical device of the present invention.

As illustrated in FIG. 14, upon directly bonding the first panel 31a (in a flat shape) and the second panel 31b (in a flat shape) using the filling-bonding material 1, the first panel 31a may be curved.

Specifically, for example, a glass plate (thickness: 200 μm) as the first panel 31a (in a flat shape) is placed along the filling-bonding material 1 and allowed to closely contact the filling-bonding material 1 while being curved under pressurization with a roller. Thus, the first panel and the second panel can be directly bonded to each other using the filling-bonding material of the present invention, while the first panel is curved.

The application of the protective panel for an optical device of the present invention is not particularly limited, and is favorably used for optical devices in various shapes not limited to flat shapes.

Examples of the optical devices include personal digital assistants (e.g., smartphones, tablet PCs), display devices (e.g., electronic paper, PDAs, TVs, game machines) equipped with image display panels such as LCDs, ELs, or PDPs, light-emitting devices (e.g., illumination lamps), and light-receiving devices (e.g., solar cells, image sensors).

For example, the protective panel for an optical device of the present invention is attached to a display module or a touch panel module using a bond or an adhesive.

The touch panel module is not particularly limited, and may be one commonly used for a display device such as a touch panel including multiple layers (e.g., ITO film). The structure of the touch panel module is not particularly limited, and examples thereof include out-cell type structure, in-cell type structure, on-cell type structure, cover glass-integrated type structure, and cover sheet-integrated type structure. The system of the touch panel module is also not particularly limited, and examples thereof include resistive film type, electrostatic capacitance type, optical type, and ultrasonic wave type.

FIG. 15 and FIG. 16 each show a view illustrating an exemplary optical device of the present invention. As shown in FIG. 15 and FIG. 16, examples of the optical device 7 of the present invention include on-board panels in various shapes (e.g., curved shape) not limited to flat shapes.

Advantageous Effects of Invention

The present invention can provide a filling-bonding material that is suitably used to fill a space between parts, while bonding the parts, in optical devices in various shapes not limited to flat shapes. The present invention can also provide a protective sheet-equipped filling-bonding material, a laminate, an optical device, and a protection panel for an optical device each including the filling-bonding material.

BRIEF DESCRIPTION OF DRAWINGS

FIG. 1 shows views schematically illustrating an exemplary filling-bonding material of the present invention and an exemplary embodiment thereof.

FIG. 2 shows views schematically illustrating an exemplary filling-bonding material of the present invention and an exemplary embodiment thereof.

FIG. 3 shows perspective views each schematically illustrating an exemplary filling-bonding material of the present invention.

FIG. 8 shows a perspective view schematically illustrating an exemplary protective sheet-equipped filling-bonding material of the present invention.

FIG. 9 shows views each schematically illustrating an exemplary protective panel for an optical device of the present invention.

FIG. 10 shows views each schematically illustrating an exemplary protective panel for an optical device of the present invention.

DESCRIPTION OF EMBODIMENTS

Figure 4A:
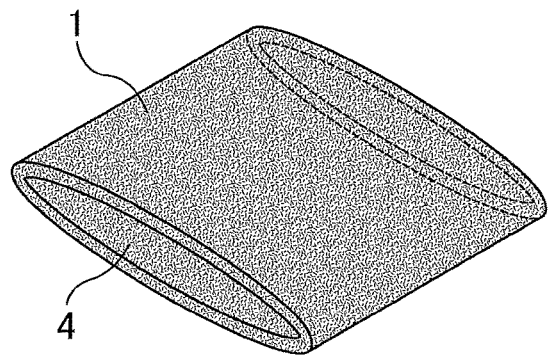
FIG. 4 shows a perspective view and a cross-sectional view each illustrating an exemplary filling-bonding material of the present invention.
Figure 4B:
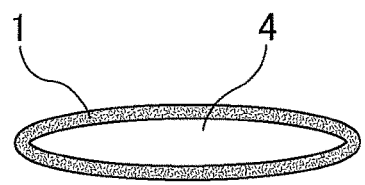
Figure 5:
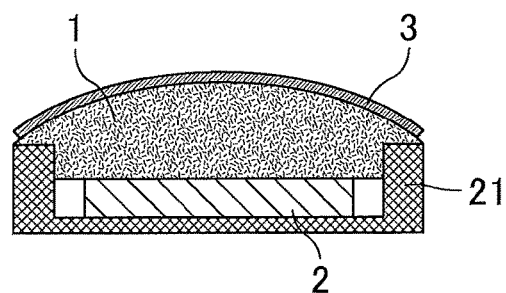
FIG. 5 shows a cross-sectional view schematically illustrating an exemplary filling-bonding material of the present invention and an exemplary embodiment thereof.
Figure 6A:
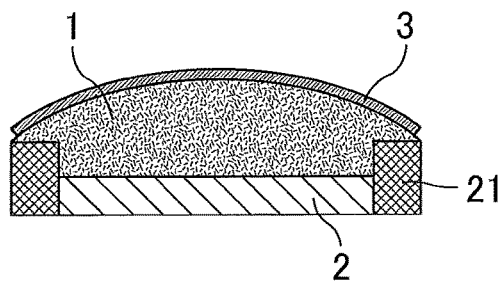
FIG. 6 shows cross-sectional views schematically illustrating an exemplary filling-bonding material of the present invention and an exemplary embodiment thereof.
Figure 6B:
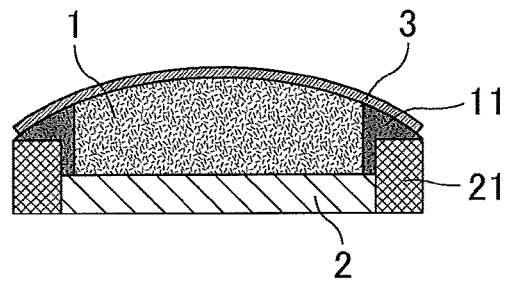
Figure 7A:
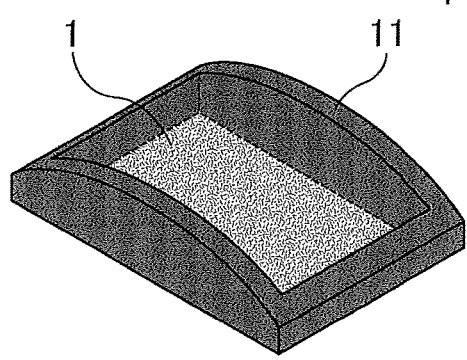
FIG. 7 shows perspective views each schematically illustrating an exemplary filling-bonding material of the present invention having a light-shielding portion.
Figure 7B:
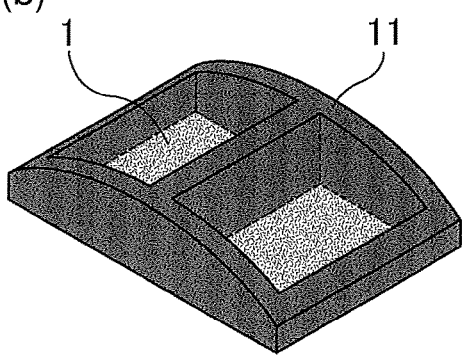
Figure 7C:
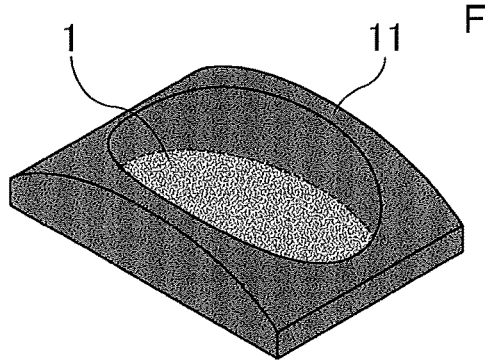
Figure 7D:
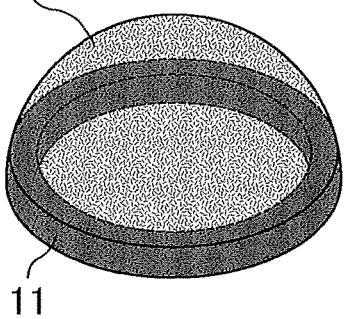
Figure 7E:
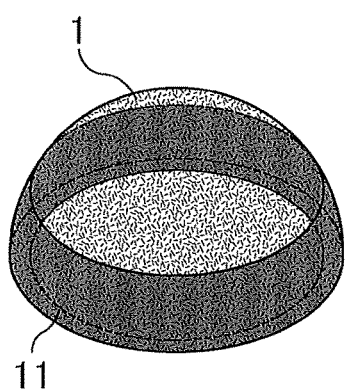
Figure 11A:
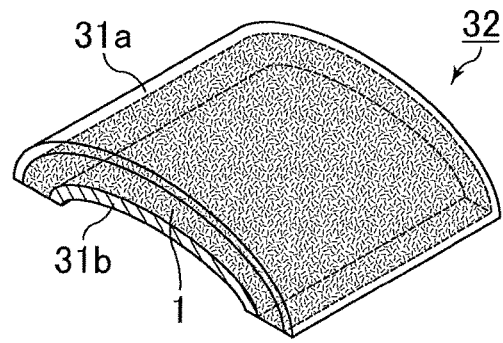
FIG. 11 shows views each schematically illustrating an exemplary protective panel for an optical device of the present invention.
Figure 11B:
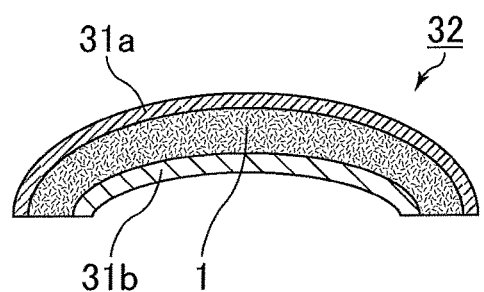
Figure 12:
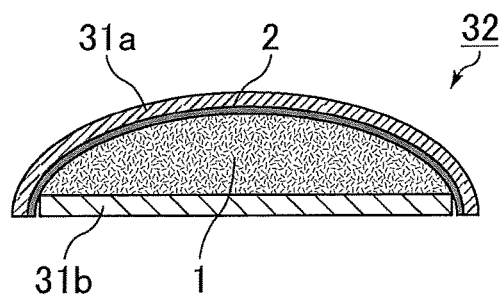
FIG. 12 shows a view schematically illustrating an exemplary protective panel for an optical device of the present invention.
Figure 13:
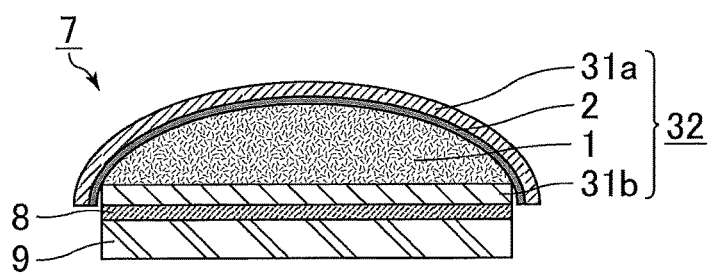
FIG. 13 shows a view schematically illustrating an exemplary embodiment of the protective panel for an optical device of the present invention.
Figure 14:
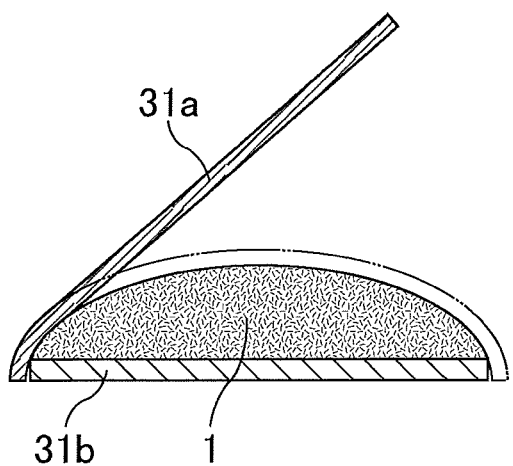
FIG. 14 shows a view schematically illustrating an exemplary method for producing the protective panel for an optical device of the present invention.
Figure 15:
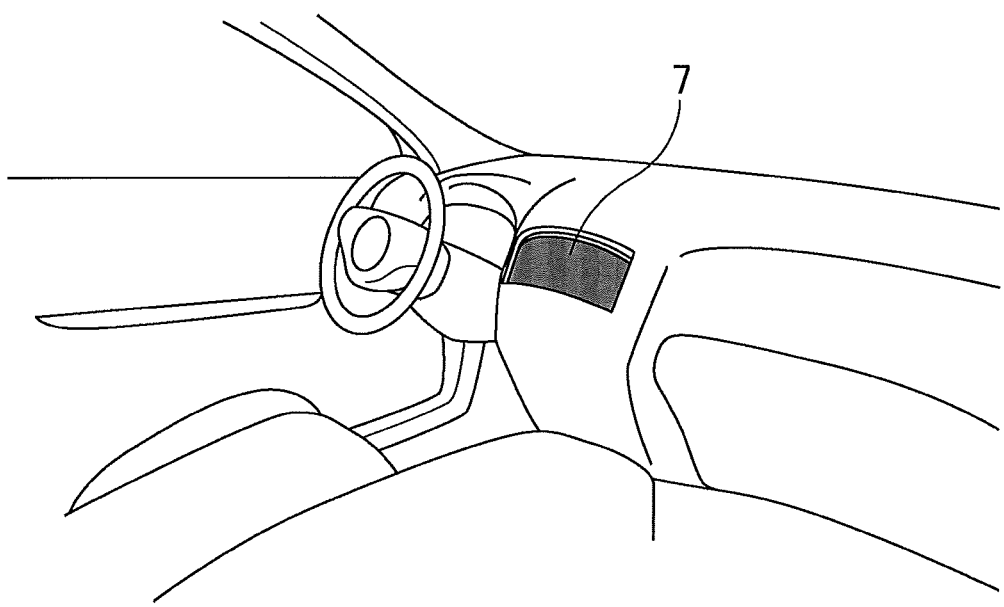
FIG. 15 shows a view schematically illustrating an exemplary optical device including the filling-bonding material of the present invention.
Figure 16:
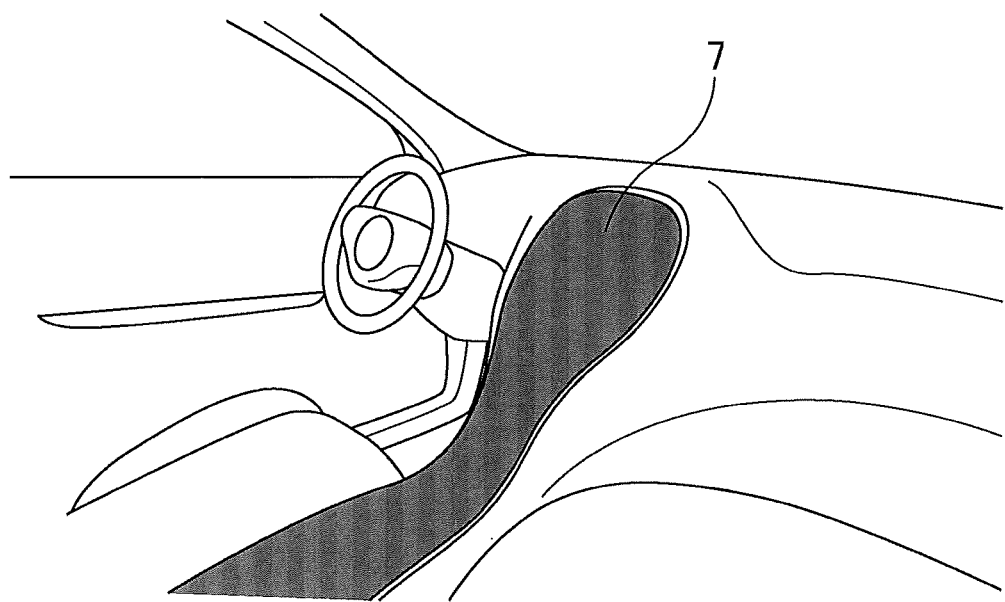
FIG. 16 shows a view schematically illustrating an exemplary optical device including the filling-bonding material of the present invention.
Figure 17A:
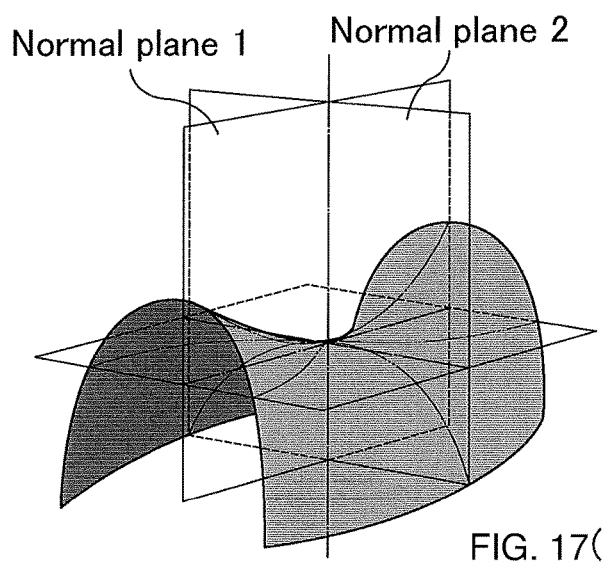
FIG. 17 shows schematic views explaining the arc length and the chord length of the curved surface.
Figure 17B:
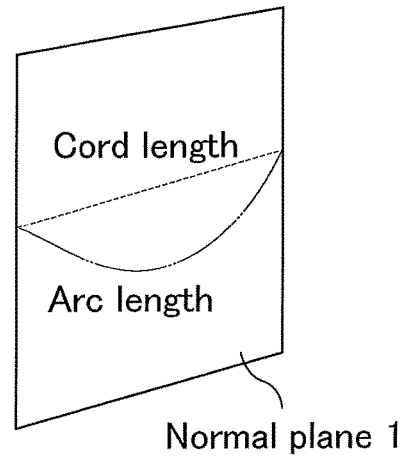
Figure 17C:
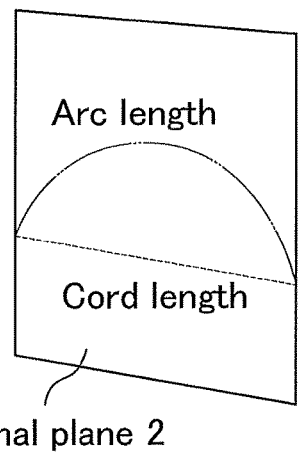

Embodiments of the present invention are more specifically described with reference to, but not limited to, the following examples.

Preparation of Polyvinyl Butyral 1 (PVB1)

A reactor equipped with a stirrer was charged with 2,700 mL of ion exchange water and 300 g of polyvinyl alcohol (average degree of polymerization: 850, degree of saponification: 99.0 mol %), and the polyvinyl alcohol was dissolved with stirring under heating. Thus, a solution was obtained. Next, to the solution was added 35% by weight hydrochloric acid as a catalyst to a hydrochloric acid concentration of 0.2% by weight. After adjustment of the solution temperature to 15° C., 21 g of n-butyraldehyde (n-BA) was added thereto with stirring. Then, 145 g of n-butyraldehyde (n-BA) was added, and polyvinyl butyral in the form of white particles was precipitated. Fifteen minutes later from the precipitation, 35% by weight hydrochloric acid was added to a hydrochloric acid concentration of 1.8% by weight, followed by heating to 50° C. and aging at 50° C. for two hours. The solution was then cooled and neutralized. The polyvinyl butyral was washed with water and dried. Thus, polyvinyl butyral (PVB1) was obtained. The obtained polyvinyl butyral 1 (PVB1) had a hydroxy group content of 31.0 mol %, an acetyl group content of 1.0 mol %, and a degree of butyralization of 68.0 mol %.

Preparation of Polyvinyl Butyral 2 (PVB2)

A reactor equipped with a stirrer was charged with 2,700 mL of ion exchange water and 300 g of polyvinyl alcohol (average degree of polymerization: 850, degree of saponification: 88.0 mol %), and the polyvinyl alcohol was dissolved with stirring under heating. Thus, a solution was obtained. Next, to the solution were added 35% by weight hydrochloric acid as a catalyst to a hydrochloric acid concentration of 0.6% by weight. After adjustment of the solution temperature to 15° C., 14 g of n-butyraldehyde (n-BA) was added with stirring. Then, 186 g of n-butyraldehyde (n-BA) was added, and polyvinyl butyral in the form of white particles was precipitated. Fifteen minutes later from the precipitation, 35% by weight hydrochloric acid was added to a hydrochloric acid concentration of 3.9% by weight, followed by heating to 45° C. and aging at 45° C. for three hours. The solution was then cooled and neutralized. The polyvinyl butyral was washed with water and dried. Thus, polyvinyl butyral 2 (PVB2) was obtained. The obtained polyvinyl butyral 2 (PVB2) had a hydroxy group content of 24.0 mol %, an acetyl group content of 12.0 mol %, and a degree of butyralization of 64.0 mol %.

Example 1

(1) Production of Filling-Bonding Material

An amount of 20 parts by weight of triethylene glycol-di-2-ethylhexanoate (3GO) as a plasticizer and 100 parts by weight of the polyvinyl butyral 1 (PVB1) prepared in (1) were mixed, and the mixture was press-molded with heating. Thus, a filling-bonding material (principal curvature: 1/1,000 mm$^{-1}$, chord length: 200 mm, maximum value (t1) of thickness: 5.2 mm, minimum value of thickness: 200 µm, maximum value of width: 200 mm) in a shape with an uneven thickness (shape including a flat surface and a convex surface facing the flat surface) was obtained.

(2) Measurement of Storage Modulus of Filling-Bonding Material at 20° C. and 80° C., Measurement of Tg (Maximum Value of Tan δ)

The viscoelasticity measurement of the filling-bonding material was performed using a dynamic viscoelastometer (ARES-G2 available from TA Instruments Japan Inc.) under the condition of increasing the temperature from −50° C. to 100° C. at a rate of temperature rise of 3° C./min and the conditions of a frequency of 1 Hz and a shearing strain of 1%. Thus, the storage moduli of the filling-bonding material at 20° C. and 80° C. were obtained. The storage moduli at 20° C. and 80° C. were 6.9×10$^7$ Pa and 9.2×10$^5$ Pa, respectively. Tg was 29.3° C.

(3) Measurement of Visible Light Transmittance and Haze

The visible light transmittance and haze of the filling-bonding material at the light-transmitting part were measured in conformity with JIS K 7136: 2000 using a spectrophotometer U4100 available from Hitachi High-Technologies Corporation.

(4) Measurement of Average Residual Phase Difference (Rave)

The light-transmitting portion of the filling-bonding material was divided into 100 sections in a plan view in the optical axis direction, and the phase difference (R0) in each divided region was measured with a light at a wavelength of 520 nm using PA-200 available from Photonic Lattice, Inc. Using the values (D) of the thicknesses at respective regions, the average of the residual phase difference (R1=R0/D) was calculated as Rave.

(5) Measurement of In-Plane Standard Deviation (s) of Phase Difference

The light-transmitting portion of the filling-bonding material was divided into 50,000 sections in a plan view in the optical axis direction, and the phase difference in each divided region was measured with light at a wavelength of 520 nm using PA-200 available from Photonic Lattice, Inc. The measurement results were processed using software (PA-View 2.2.4), and the in-plane standard deviation (s) of the phase difference was obtained.

Example 2

The filling-bonding material obtained in Example 1 was placed in a mold of the same size, and subjected to annealing treatment (60° C. for five hours).

Example 3

A filling-bonding material was obtained as in Example 2, except that the amount of the added plasticizer was changed to 30 parts by weight.

Example 4

A filling-bonding material was obtained as in Example 2, except that PVB2 was used instead of PVB1 and the amount of the added plasticizer was changed to 60 parts by weight.

Example 5

A filling-bonding material was obtained as in Example 4, except that the amount of the added plasticizer was changed to 25 parts by weight.

Example 6

A filling-bonding material was obtained as in Example 1, except that a cobalt blue pigment (C. I. pigment blue 28 available from Asahi Kasei Kogyo Co., Ltd.) was added to the plasticizer. The cobalt blue pigment was added in an amount of 0.02 parts by weight relative to 100 parts by weight of PVB1.

Example 7

A filling-bonding material was obtained as in Example 1, except that a cobalt blue pigment (Nanotek cobalt blue Slurry (15% alcohol solution) available from C. I. Kasei Co., Ltd.) was added to the plasticizer. The cobalt blue pigment (solid content) was added in an amount of 0.012 parts by weight relative to 100 parts by weight of PVB1.

Example 8

A filling-bonding material was obtained as in Example 7, except that the amount of the cobalt blue pigment (solid content) was changed to 0.0072 parts by weight relative to 100 parts by weight of PVB1.

Example 9

A filling-bonding material was obtained as in Example 2, except that the annealing temperature was changed to 40° C.

Example 10

A filling-bonding material was obtained as in Example 1, except that no plasticizer was added.

Evaluation

The filling-bonding materials obtained in Examples 1 to 9 were evaluated by the following methods. Table 1 shows the results.

(1) Evaluation of Filling/Bonding Properties Between Parts

Two sheets of plate glass (200 mm×100 mm, thickness: 1 mm) were prepared. One was used as it was (flat plate). The other was subjected to heat-molding to be curved in a direction of the 200-mm side, preparing a curved glass having a curvature radius of 1,000 mm.

Next, the filling-bonding material obtained in each example was placed such that its flat surface faces the flat glass, and the curved glass was placed to correspond to the curved surface of the filling-bonding material. Thus, the flat glass, the filling-bonding material, and the curved glass were stacked in the stated order.

Then, the laminate was treated in a heating vacuum laminator under the conditions of 70° C. and 200 Pa for three minutes. The laminate was further treated in an autoclave at 70° C. and 5 Mpa for 30 minutes. Thus a laminate including the flat glass, the filling-bonding material, and the curved glass (protective panel for an optical device in which the plate glass and the curved glass were directly bonded to each other using the filling-bonding material) was produced. The obtained laminate was visually observed in an initial state (right after the production) and 48 hours later to check the presence or absence of a remaining space or foaming due to defective lamination. The case where no remaining space or foaming was observed was rated good (○) and the case where a remaining space or foaming was observed was rated poor (x).

(2) Evaluation of High-Temperature Reliability

A laminate (protective panel for an optical device in which the flat glass and the curved glass were directly bonded to each other using the filling-bonding material) obtained as in (1) was allowed to stand still in a high-temperature and high-humidity environment (85° C., 85%) for 240 hours, and the presence or absence of foaming was visually checked. The case where no foaming was observed was rated good (○) and the case where foaming was observed was rated poor (x).

(3) Evaluation of Optical Quality

Characters in white were displayed on a black background on the flat display, and the black display portion in the background was observed through polarizing glasses. Next, the laminate (protective panel for an optical device in which flat glass and curved glass were directly bonded to each other using the filling-bonding material) obtained as in (1) was placed on the screen of the flat display, and the presence or absence of a white part (white blank) and the presence or absence of blurring of the characters were visually observed.

The results before and after the placement of the laminate on the flat display were compared. With regard to the presence or absence of a white part (white blank), the case where any change in color was not observed, while black display was maintained, in the black display portion was rated good (○). The case where a sense of discomfort was evoked, though no white portion was recognized, was rated fair (Δ). The case where a white part was clearly visually observed was rated poor (x). Similarly, with regard to the presence or absence of blurring of the characters, the case where the outlines of the characters were clearly recognized was rated good (○). The case where distorted outlines of the characters were recognized was rated fair (Δ). The case where the shapes of the characters were clearly deformed to be blurred was rated poor (x).

TABLE 1

| | Composition | | | Treatment Annealing | Elasticity | | | Optical characteristics | | | | | Filing/bonding properties | | | Optical quality | |
|---|---|---|---|---|---|---|---|---|---|---|---|---|---|---|---|---|---|
| | Resin | Plasticizer Parts by weight | Pigment Parts by weight | | G' at 20° C. Pa | G' at 80° C. Pa | Tg ° C. | Visible light transmittance % | Haze % | Rave nm/mm | s nm | | Presence or absence of foaming right after production | Presence or absence of foaming 48 hours later | High-temperature reliability | Presence or absence of white blank | Presence or absence of blurring |
| | | Parts by weight | | | | | | | | | | | | | | | |
| Example 1 | PVB1 | 20 | 0 | Not performed | $6.9 \times 10^7$ | $9.2 \times 10^5$ | 29.3 | 91.2 | 0.1 | 21.5 | 12.1 | | ○ | ○ | ○ | x | ○ |
| Example 2 | PVB1 | 20 | 0 | 60° C. 5 h | $7.3 \times 10^7$ | $8.6 \times 10^5$ | 29.5 | 91 | 0.1 | 5.2 | 2.2 | | ○ | ○ | ○ | ○ | ○ |
| Example 3 | PVB1 | 30 | 0 | 60° C. 5 h | $1.7 \times 10^7$ | $4.6 \times 10^5$ | 18.8 | 91.3 | 0.1 | 4.9 | 1.9 | | ○ | ○ | ○ | ○ | ○ |
| Example 4 | PVB2 | 60 | 0 | 60° C. 5 h | $2.2 \times 10^6$ | $3.5 \times 10^5$ | −4.3 | 91.3 | 0.1 | 2.9 | 1.7 | | ○ | ○ | x | ○ | ○ |
| Example 5 | PVB2 | 25 | 0 | 60° C. 5 h | $9.8 \times 10^6$ | $4.1 \times 10^5$ | 22.1 | 91.1 | 0.1 | 2.9 | 1.7 | | ○ | ○ | ○ | ○ | ○ |
| Example 6 | PVB1 | 20 | 0.02 | Not performed | $7.1 \times 10^7$ | $8.6 \times 10^5$ | 30.1 | 78.1 | 2.6 | 22.4 | 13.5 | | ○ | ○ | ○ | x | x |
| Example 7 | PVB1 | 20 | 0.012 | Not performed | $7.5 \times 10^7$ | $8.8 \times 10^5$ | 29.5 | 86.1 | 0.4 | 21.5 | 12.2 | | ○ | ○ | ○ | x | Δ |
| Example 8 | PVB1 | 20 | 0.0072 | Not performed | $7.5 \times 10^7$ | $8.9 \times 10^5$ | 28.7 | 88.4 | 0.3 | 21.8 | 11.9 | | ○ | ○ | ○ | x | ○ |

TABLE 1-continued

| | Composition | | | Treatment Annealing | Elasticity | | | Optical characteristics | | | | Evaluation | | | | |
|---|---|---|---|---|---|---|---|---|---|---|---|---|---|---|---|---|
| | | | | | | | | | | | | Filing/bonding properties | | | Optical quality | |
| | | | | | | | | Visible light trans- mittance % | | | | Presence or absence of foaming right after pro- duc- tion | Presence or absence of foam- ing 48 hours later | High- temper- ature reli- ability | Pres- ence or ab- sence of white blank | Pres- ence or ab- sence of blur- ring |
| | Resin | Plasti- cizer | Pig- ment | | G' at 20° C. Pa | G' at 80° C. Pa | Tg ° C. | | Haze % | Rave nm/ mm | s nm | | | | | |
| | Parts by weight | Parts by weight | Parts by weight | | | | | | | | | | | | | |
| Example 9 | PVB1 | 20 | 0 | 40° C. 5 h | $7.0 \times 10^7$ | $9.1 \times 10^5$ | 29.5 | 91.4 | 0.1 | 11.4 | 5.1 | ○ | ○ | ○ | ○ | ○ |
| Example 10 | PVB1 | 0 | 0 | Not per- formed | $8.5 \times 10^8$ | $2.5 \times 10^6$ | 68.8 | 90.8 | 0.1 | 22.3 | 13.8 | ○ | x | x | x | ○ |

INDUSTRIAL APPLICABILITY

The present invention can provide a filling-bonding material that is suitably used to fill a space between parts, while bonding the parts, in optical devices in various shapes not limited to flat shapes. The present invention can also provide a protective sheet-equipped filling-bonding material, a laminate, an optical device, and a protective panel for an optical device each including the filling-bonding material.

REFERENCE SIGNS LIST 1 filling-bonding material
11 light-shielding portion
2 touch panel module
21 chassis
3 surface protection panel
31a first panel
31b second panel
32 protective panel for an optical device
4 hollow
5 protective sheet
6 protective sheet-equipped filling-bonding material
7 optical device
8 bond or adhesive
9 display module

The invention claimed is:

1. A self-supporting filling-bonding material having a shape with an uneven thickness,
   wherein a width of the filling-bonding material has a value of 50 mm or greater,
   wherein the uneven thickness being defined between a curved surface and an opposing surface, wherein the curved surface has a principal curvature of $1/1000$ mm$^{-1}$ or more and has a positive or negative Gaussian curvature, and
   wherein the filling-bonding material has a light-transmitting portion, wherein the light transmitting portion has an average residual phase difference ($R_{ave}$) of 20 nm/mm or less and/or an in-plane standard deviation (s) of a phase difference of 10 nm or less.

2. The filling-bonding material according to claim 1, wherein the light transmitting portion has a visible light transmittance of 80% or higher and a haze of 1% or lower.

3. The filling-bonding material according to claim 1, wherein the opposing surface is a flat surface.

4. The filling-bonding material according to claim 1, wherein a thickest part of the filling-bonding material comprises a thickness of 500 μm or greater.

5. The filling-bonding material according to claim 1, wherein the curved surface has a chord length of 50 mm or longer.

6. The filling-bonding material according to claim 1, having a glass transition temperature (Tg) of 10° C. or higher and 60° C. or lower.

7. The filling-bonding material according to claim 1, having a storage modulus at 20° C. of $1\times10^4$ Pa or greater and $1\times10^{10}$ Pa or lower.

8. The filling-bonding material according to claim 1, comprising a polyvinyl acetal.

9. The filling-bonding material according to claim 1, further comprising a light-shielding portion or a light-scattering portion.

10. The filling-bonding material according to claim 9, wherein the light-shielding portion has a visible light transmittance of 10% or lower.

11. The filling-bonding material according to claim 9, wherein the light-scattering portion has a haze of 10% or higher.

12. The filling-bonding material according to claim 9, wherein the light-shielding portion or the light-scattering portion contains a dye or a pigment.

13. The filling-bonding material according to claim 9, wherein the light-shielding portion or the light-scattering portion is positioned at a periphery of the filling-bonding material.

14. A protective sheet-equipped filling-bonding material comprising:
the filling-bonding material according to claim 1; and
a protective sheet covering the filling-bonding material.

15. A laminate comprising:
a pair of bonded parts; and
the filling-bonding material according to claim 1,
the filling-bonding material filling a space between the pair of bonded parts.

16. An optical device comprising the laminate according to claim 15,
the pair of bonded parts including at least one transparent part,
the transparent part and the filling-bonding material having a difference in refractive index of 0.03 or less.

17. A protective panel for an optical device comprising:
a first panel;
a second panel; and
a self-supporting filling-bonding material having a shape with an uneven thickness, the uneven thickness being defined between a curved surface and an opposing surface, wherein the curved surface has a principal curvature of $1/5000$ mm$^{-1}$ or more,
at least one of the first panel or the second panel having a curved surface,
the first panel and the second panel being directly bonded to each other with the filling-bonding material,
wherein the filling-bonding material has a light-transmitting portion, wherein the light transmitting portion has an average residual phase difference ($R_{ave}$) of 20 nm/mm or less and/or an in-plane standard deviation (s) of a phase difference of 10 nm or less.

18. The protective panel for an optical device according to claim 17,
wherein the panel with a curved surface, of the first panel and the second panel, and the filling-bonding material have a difference in refractive index of 0.1 or less.

19. The protective panel according to claim 17, wherein the filling-bonding material has a storage modulus at 23° C. of 1 MPa or greater and a tensile strength at break of 1 MPa or greater.

20. The protective panel for an optical device according to claim 17,
wherein at least one of the first panel or the second panel is a glass plate.

21. The protective panel according to claim 20, wherein the filling-bonding material has a 180° peel strength at 300 mm/min of 5 N/25 mm or greater.

22. An optical device comprising the protective panel for an optical device according to claim 17.

* * * * *